US012544289B2

(12) United States Patent
Piovanelli et al.

(10) Patent No.: US 12,544,289 B2
(45) Date of Patent: Feb. 10, 2026

(54) TROLLEY FOR THE DISPENSING OF MEDICINES

(71) Applicant: ANTARES VISION S.p.A., Travagliato (IT)

(72) Inventors: Andrea Piovanelli, Travagliato (IT); Adriano Fusco, Travagliato (IT); Andrea Martinelli, Travagliato (IT)

(73) Assignee: ANTARES VISION S.p.A., Travagliato (IT)

( * ) Notice: Subject to any disclaimer, the term of this patent is extended or adjusted under 35 U.S.C. 154(b) by 275 days.

(21) Appl. No.: 18/264,415

(22) PCT Filed: Feb. 15, 2022

(86) PCT No.: PCT/IB2022/051316
§ 371 (c)(1),
(2) Date: Aug. 5, 2023

(87) PCT Pub. No.: WO2022/172252
PCT Pub. Date: Aug. 18, 2022

(65) Prior Publication Data

US 2024/0091089 A1 Mar. 21, 2024

(30) Foreign Application Priority Data

Feb. 15, 2021 (IT) ........................ 102021000003341
Jun. 21, 2021 (IT) ........................ 102021000016235

(51) Int. Cl.
*A61G 12/00* (2006.01)
*A61J 7/00* (2006.01)
*B62B 3/00* (2006.01)

(52) U.S. Cl.
CPC .......... *A61G 12/001* (2013.01); *A61J 7/0069* (2013.01); *A61J 7/0076* (2013.01); *B62B 3/005* (2013.01)

(58) Field of Classification Search
CPC ..... A61G 12/001; A61J 7/0069; A61J 7/0076; B62B 3/005
USPC ........................................................ 280/47.35
See application file for complete search history.

(56) References Cited

U.S. PATENT DOCUMENTS 4,114,965 A * 9/1978 Oye ..................... A61G 12/001 D24/185
4,588,237 A * 5/1986 Marder ................ A61G 12/001 312/308
4,967,928 A 11/1990 Carter
5,197,632 A * 3/1993 Kaufman .................. A61J 7/04 221/197
5,431,299 A * 7/1995 Brewer ................... G07F 11/58 221/12
6,170,929 B1 * 1/2001 Wilson .................. A61B 50/13 221/21

(Continued)

FOREIGN PATENT DOCUMENTS

CN 118697579 A * 9/2024 ........... A61G 12/001
DE 37 36 378 A1 5/1988

(Continued)

*Primary Examiner* — James A Shriver, II
(74) *Attorney, Agent, or Firm* — ASLAN LAW, P.C.

(57) ABSTRACT

A trolley for the dispensing of medicines, comprising an entry area of at least one medicine into the trolley and an exit area of the medicine from the trolley, a movement assembly configured to move the medicine between the entry area and the exit area, the exit area being in a position close to said worktop.

11 Claims, 12 Drawing Sheets

(56) References Cited

U.S. PATENT DOCUMENTS

| | | | | |
|---|---|---|---|---|
| 10,296,719 | B2 * | 5/2019 | Ekin | G16H 20/13 |
| 11,854,680 | B1 * | 12/2023 | Gershoni | A61J 7/0069 |
| 12,156,836 | B1 * | 12/2024 | Neal | A61B 50/13 |
| 2004/0148055 | A1 * | 7/2004 | Shoenfeld | G07F 11/62 700/237 |
| 2006/0079994 | A1 * | 4/2006 | Chu | G07F 11/62 700/231 |
| 2007/0078562 | A1 | 4/2007 | Park, IV | |
| 2009/0108017 | A1 * | 4/2009 | Schifman | G07F 11/165 221/133 |
| 2011/0172815 | A1 | 7/2011 | Kim | |
| 2016/0175176 | A1 * | 6/2016 | Pamplona Rovira | A61G 12/001 280/79.2 |
| 2016/0193733 | A1 * | 7/2016 | Abdullah | A61B 5/4833 901/1 |
| 2018/0028408 | A1 * | 2/2018 | Li | A61J 7/0445 |
| 2025/0205006 | A1 * | 6/2025 | Brunette | A61B 50/13 |

FOREIGN PATENT DOCUMENTS

| | | | | | |
|---|---|---|---|---|---|
| EP | 2 960 184 | A1 | | 12/2015 | |
| GB | 2 564 672 | A | | 1/2019 | |
| JP | H07 27584 | U | | 5/1995 | |
| WO | WO-0032073 | A1 | * | 6/2000 | G07F 17/0092 |
| WO | WO-2022172252 | A1 | * | 8/2022 | A61G 12/001 |
| WO | WO-2022172254 | A1 | * | 8/2022 | A61G 12/001 |
| WO | WO-2024177667 | A1 | * | 8/2024 | A61G 12/008 |
| WO | WO-2025032350 | A1 | * | 2/2025 | A47B 88/969 |

* cited by examiner

Fig.11
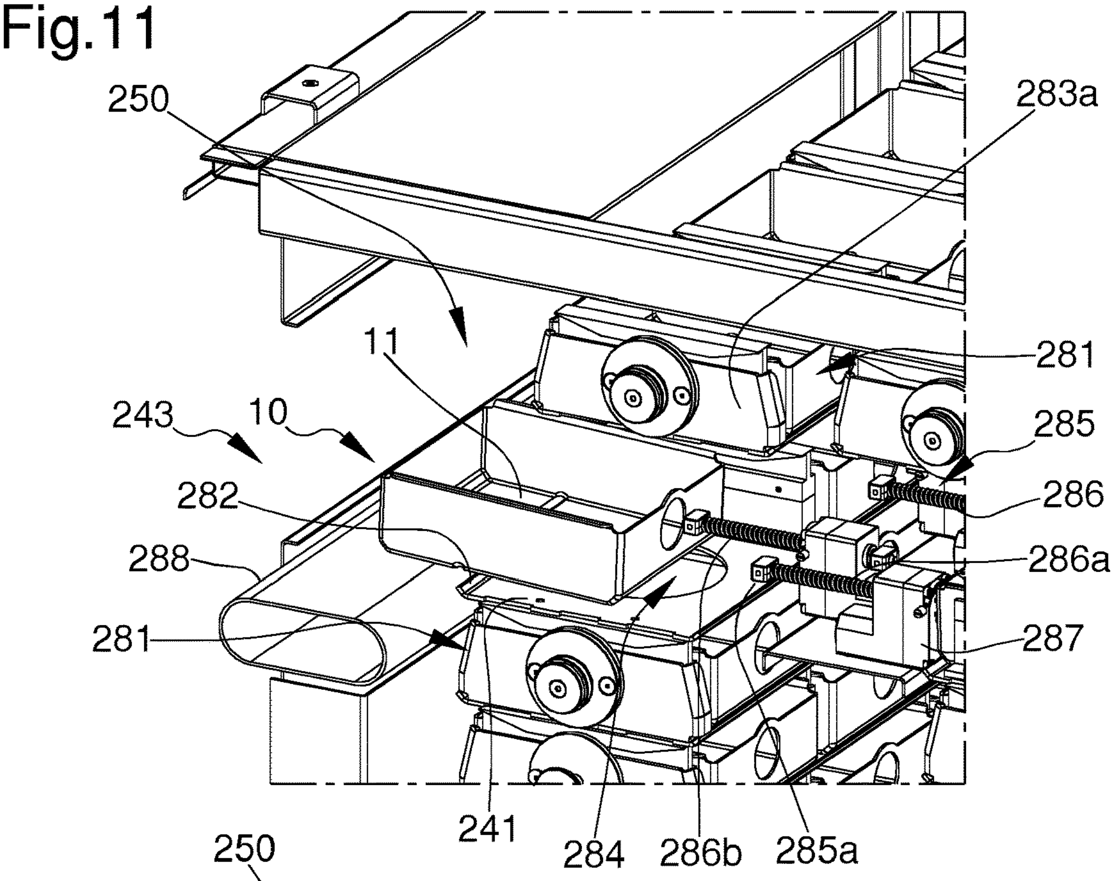
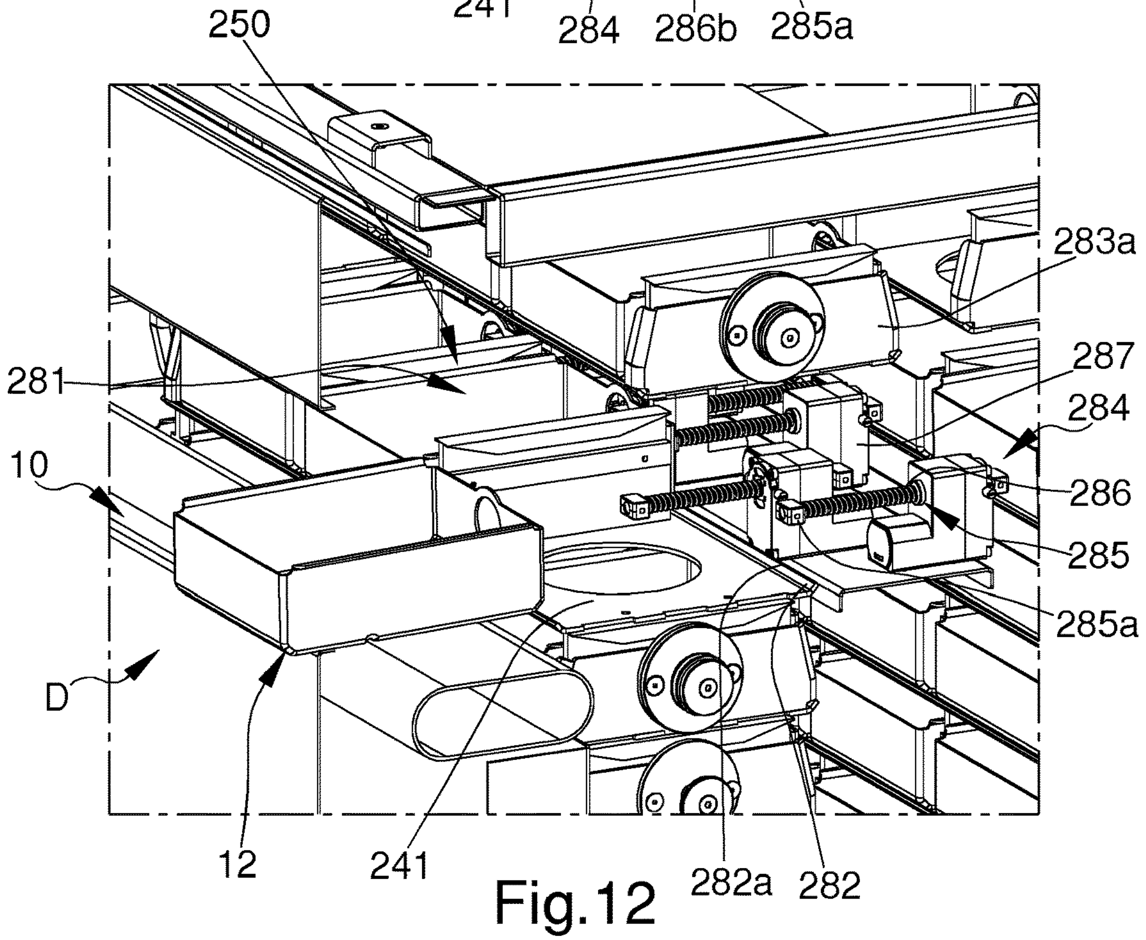
Fig.12

TROLLEY FOR THE DISPENSING OF MEDICINES

CROSS-REFERENCE TO RELATED APPLICATIONS

This application claims priority to IT patent application No. 102021000003341 filed on Feb. 15, 2021, to IT patent application No. 102021000016235 filed on Jun. 21, 2021, and this application claims priority to and is a 371 of international PCT Application No. PCT/IB2022/051316 filed on Feb. 15, 2022, the entire contents of which are hereby incorporated by reference.

TECHNICAL FIELD

The present invention relates to a trolley for the dispensing of medicines, in particular to a trolley which can be used in hospital environments by nursing staff in order to administer drug treatment to patients.

Although the trolley of the present invention has a preferred, but not exclusive, application in hospital environments, the following description will make explicit reference to this sector without, however, losing generality.

BACKGROUND ART

In the remainder of the present description and in the subsequent claims, "drug" means both a product and/or preparation having curative properties and medical devices meant as instruments used for diagnostic and/or therapeutic objects. In the remainder of the disclosure, different terms may be used which are to be considered as synonyms such as, e.g., medicament, medicine, treatment, etc. without altering the meaning or purpose. It should also be noted that the dispensing of a drug may be carried out by means of prior packaging inside a blister pack, box, bottle, syringe or other similar container before being administered to a patient. Therefore, the term drug may also comprise the packaging thereof.

Various technologies associated with the trolleys for the safe dispensing and administration of the medicines to patients are known. In fact, errors in the administration of drugs to patients are often due to many factors such as, e.g., the inconsistency of the nursing staff's work (fatigue, stress, etc.), the incorrect reading of the medical record and/or the pickup of the wrong medicine from the trolley.

In this context, several solutions have been developed over the years to overcome these drawbacks.

EP3424481A1, for example, describes an apparatus for the transport of medicines provided with a plurality of medicine holder compartments which can be individually opened and closed. Each container has a lid which may be selectively displaced between an open position and a closed position and mechanically associated with a corresponding fastening/release element. The bottom of each container is electrically connected to a printed circuit placed at the bottom which controls the fastening/release elements in order to move the lid between the open and the closed position.

US2006079994A1 describes a trolley for the dispensing of drugs in a unit dose and is provided with a plurality of lockable drug holder drawers associated with a light indicator. The trolley is also provided with an RFID reader that is used to retrieve the data from an RFID tag and worn by the nursing staff to transmit the captured information to a computer provided in the trolley. The captured information can be displayed on the screen of the trolley and is sent from the computer to a remote database that contains information about the patient's specific medical record, prescription data and pharmaceutical data. The prescription data and pharmaceutical data corresponding to the information retrieved from the RFID tag is then transferred to the computer and is used to control the opening of the drawers of the trolley. For example, one of the lockable drawers may be released based on the prescription data and pharmaceutical data corresponding to the identification number stored in the patient's RFID tag. In addition, when a patient is identified, the light indicator of a corresponding drawer is activated thereby directing the nursing staff to the corresponding drawer in order to pick up the pre-packaged medicine per unit dose housed in the drawer. Before administering the drug to the patient, the nursing staff can check the drug using the pharmaceutical information displayed on the screen.

WO2001097745A1 describes, among other things, a computerized trolley that can be moved between the wards of a hospital unit for the dispensing of the drugs. During use, the trolley is approached to the patient's bed and by means of an optical reader mounted on board the trolley, the computer (administrative, clinical, etc.) data are read in advance from the bracelet worn by the patient and, if necessary, those of an appropriate label associated with the patient's paper medical record, thus checking the correspondence of the patient's personal data. The information relating to the therapy to be followed and therefore to the drugs to be administered are thus processed by a computer, which applies predetermined rules of congruence of the preset activities in order to control the actuator relating to the opening of the drawer containing the drug to be administered. Alternatively, reading the patient's bracelet, together with reading the label placed on the sealed container, activates the computer to issue an authorization to the operator for the opening and then the administration of the picked-up drug to the patient.

The solutions described above, although allowing the hospital staff to pick up the correct drug to be administered, introduce a multitude of other problems that make the storage and pickup of the drugs from the trolley impractical and do not allow an optimized design of the latter to facilitate not only the storage but also the safe dispensing of the drugs in hospital environments.

DESCRIPTION OF THE INVENTION

The Applicant, as a result of the aforementioned problems, has thus thought of making an innovative trolley which does not have the drawbacks of the prior art. Therefore, one object of the present invention is to provide a solution which allows as many drugs/medicines as possible to be stored in the trolley so as to allow healthcare providers to treat a large number of patients during the same ward trip.

A further object of the present invention is to enable healthcare providers to pick up all the drugs to be administered from an always elevated and comfortable position at all times regardless of the amount of drugs already administered and of the remainder of the latter in the trolley.

A further object of the present invention is to move the drugs inside the trolley indirectly, that is, avoiding handling containers and/or blister packs which have different shapes and sizes from drug to drug, but acting only on particular trays in order to create a univocal association between the latter and one or more predefined drugs to be administered.

An additional object of the present invention is to be able to visually inspect the drugs prior to their pickup from the trolley.

A further object of the present invention is to achieve automatic recognition of the drugs using a smart vision system which does not infringe on the privacy of inpatients.

Yet another object of the present invention is to promote transportation of the trolley by means of an assisted driving system and facilitating any changes in direction even in extremely small spaces.

A further object of the present invention is to allow the trolley to interface with one or more cabinets for the storage and movement of medicines.

A further object of the present invention is to allow the trolley, while interfacing with the cabinet, to perform several activities at the same time, such as e.g. the optimized exchange of the trays containing the drugs, the charging of trolley batteries and other activities which will be better appreciated in the remainder of the present description.

These and other objects are covered by the present invention, which relates to a trolley for the dispensing of medicines according to claim 1 and having structural and functional characteristics such as to meet the above requirements while at the same time obviating the drawbacks discussed above with reference to the prior art.

BRIEF DESCRIPTION OF THE DRAWINGS

Other characteristics and advantages of the present invention will become more apparent from the description of a preferred, but not exclusive, embodiment of a trolley for the dispensing of medicines, illustrated by way of an indicative, yet non-limiting example, in the accompanying tables of drawings wherein:

FIGS. 10, 11 and 12 are perspective and detailed views of the movement assembly and of the pushing means of the trolley in FIG. 1.

EMBODIMENTS OF THE INVENTION

Figure 1:
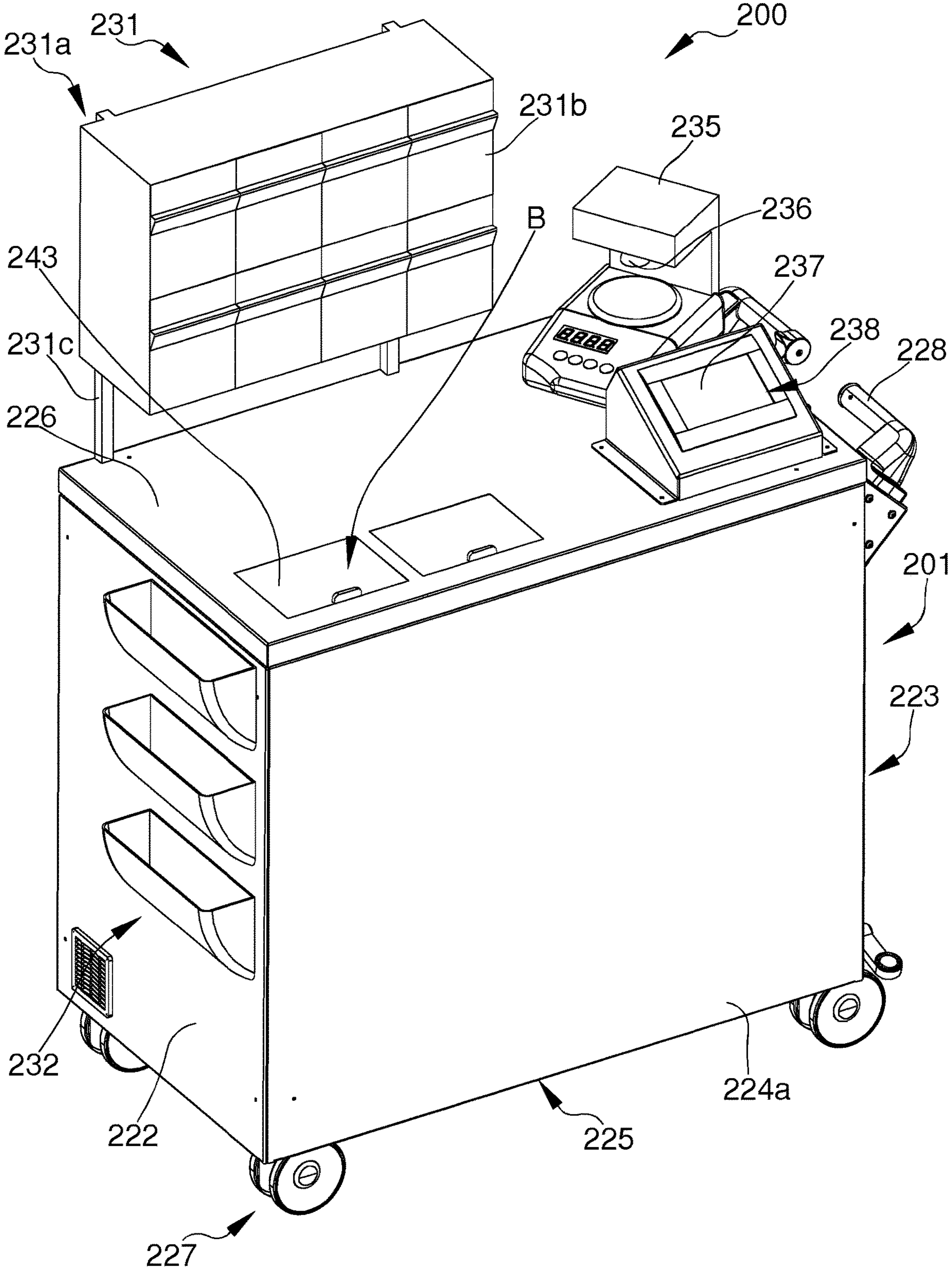
FIGS. 1 and 2 are side perspective views of two embodiments of the trolley according to the present invention.

With particular reference to such figures, reference numeral 200 globally indicates a trolley for the dispensing of medicines according to the present invention.

The trolley 200 comprises a body 201, preferably having a mainly vertical development, bounding a housing compartment 221 for the storage of a plurality of medicines. The body 201 is provided with a worktop 226 positioned above the housing compartment 21. In this case, the body 201 is defined as a whole by four side walls (a front wall 222, a rear wall 223 and two side walls 224*a*, 224*b*), a base 225 and an upper or worktop 226.

In the context of the present disclosure, the terms “upper” and “lower”, “front”, “rear”, “vertical” and “horizontal”, as used with reference to the trolley 200, shall be understood to refer to the conditions of normal use of the trolley 200, i.e., those in which it is used by a user and is placed resting on the ground.

The base 225 of the trolley 200 comprises at least one wheel 227, preferably a swivel wheel, oriented downwardly to move the trolley 200 along at least one direction of forward movement.

Preferably, with the base 225 of the trolley 200 are associated four wheels 227, preferably swivel wheels, arranged substantially at the vertices of the base 225 to be able to move the trolley 200 along at least one direction of forward movement. For this purpose, the trolley 200 is provided with a handlebar 228 which can be gripped by an operator to drive and displace the trolley 200 and preferably fixed at the rear wall 223. Alternative embodiments cannot however be ruled out wherein a pair of wheels 227 may be of a fixed type of orientation, e.g. with only the pair of front wheels pivoting or otherwise only the rear wheels.

Advantageously, the trolley 200 comprises an assisted driving device 230 configured to automatically adjust the speed of movement of the trolley 200 based on the thrust force operated on the trolley by the operator. In particular, the assisted driving device 230 comprises one or more motorized wheels to promote the movement of the trolley 200.

Conveniently, the device 230 is rotatable around its own vertical axis and allows the speed and direction of movement of the trolley 200 to be independently adjusted in order to displace it within the hospital ward even without an operator pushing it.

According to one embodiment, the trolley 200 is provided with a plurality of secondary accessories and of primary accessories intended to facilitate the work of healthcare providers. In this regard, the secondary accessories may, e.g., comprise a consumable holder assembly 231, waste containers, controlled access pockets and/or drawers 232, refrigerated drawer for temperature-controlled drugs, label printer, etc., while the primary accessories comprise, e.g., a scale 235, a camera 236, a display 237, processing means 238, operator identification system, etc., which will be described in detail later in the present description. Conveniently, the consumable holder assembly 231 is fixed at the point where the worktop 226 is located and comprises a framework 231*a* supporting a plurality of housings 231*b* which can be opened and closed towards the worktop 226. In the illustrated embodiments, the preferably transparent housings 231*b* are hinged horizontally so as to be able to rotate at least partly outwardly in order not to reduce the space of the worktop 226 when open. Different embodiments cannot however be ruled out wherein the housings 231*b* comprise horizontally sliding drawers, e.g. with a controlled access, or compartments closed by small openable doors and hinged horizontally/vertically, as appropriate. Conveniently, the housings 231*b* are intended for the storage of disposable medical supplies such as, e.g., gauze, syringes, disinfectants, gloves, tourniquets, etc.

Advantageously, the consumable holder assembly 231 is lifted from the trolley 200 by means of one or more supporting rods 231*c* fixed to the worktop 226, preferably in a position close to one side of the trolley 200 (in the case shown in FIG. 1, the right side with reference to the operator’s point of observation) so that the surface of the latter is as free as possible in order to ensure that operators can use as much space as possible.

Figure 2:
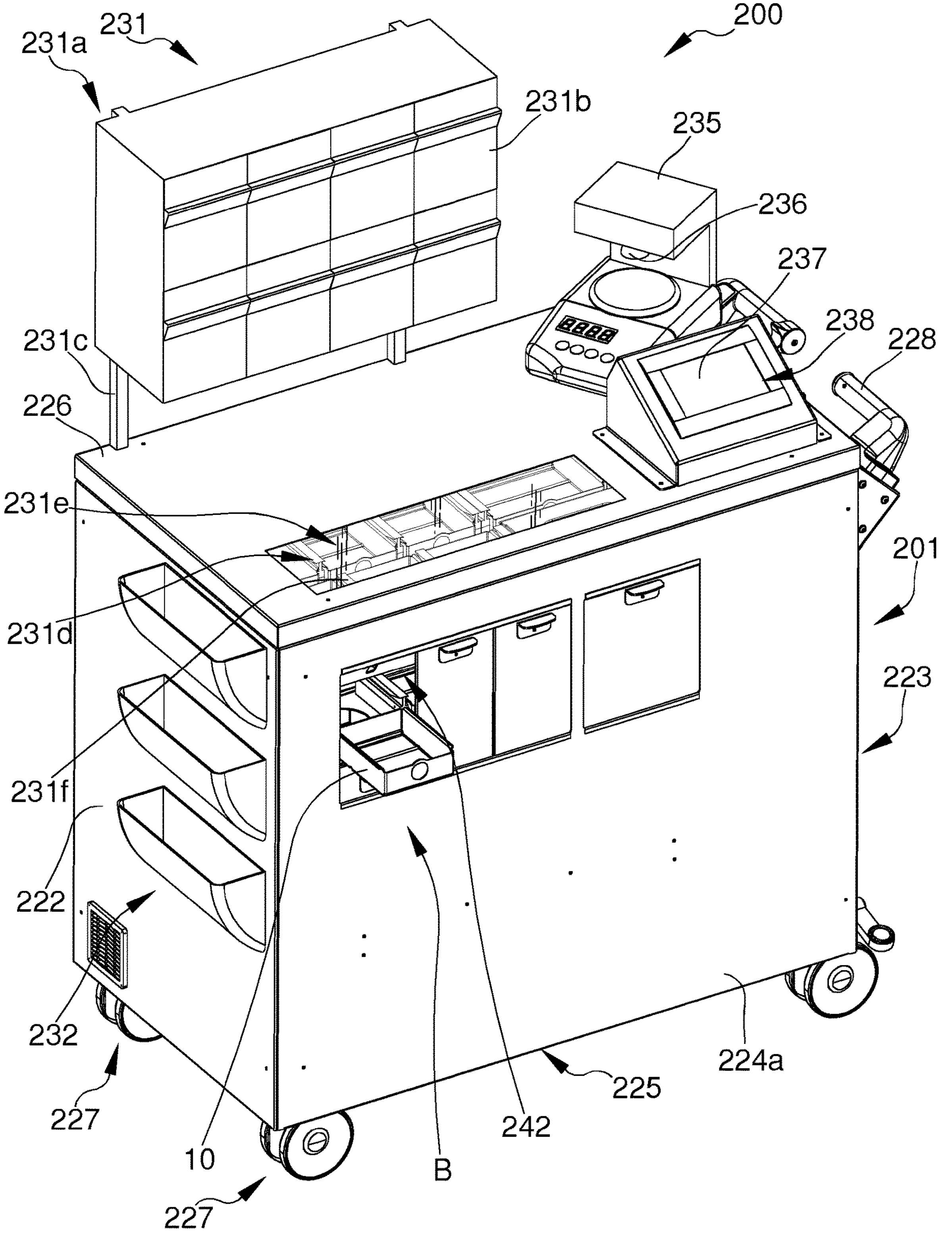

Conveniently, the worktop 226 may comprise a transparent portion, shown in FIG. 2, to allow the operator to look inside the trolley 200 the medicines that will gradually exit the trolley. For this purpose, the worktop 226 comprises an opening with which a glass, or similar transparent material, is associated. The opening is formed so as to leave one or more non-transparent portions of the worktop 226 around the transparent portion. The non-transparent portions are arranged inferiorly to the assembly 231 and at the point where the rear wall 223 is located so that instruments or healthcare objects in general may be placed or secured thereon.

As shown in the examples of FIGS. 1 and 2, the trolley 200 may be provided with a plurality of pockets 232 fixed to the front wall 222 to be able to house paper documents, such as e.g. inpatient's medical records. In a preferred embodiment, the pockets 232 are three in number and fixed one above the other. Even more preferably, the pockets 232 have less width than the width of the front wall 222 and are arranged closer to one of the sides of the trolley 200, e.g. the left side, so as not to occupy all of the available wall space and to allow for other accessory elements for the trolley.

As shown in the examples in FIGS. 1 and 2, the trolley 200 may comprise one or more containers 232 for hospital waste. In a preferred embodiment, the container 232 is accessible via a side or upper opening which can be closed.

As shown in FIG. 1, the trolley 200 may comprise a scale 235 configured to weigh drugs and/or any preparations prior to their administration to the patient.

As shown in FIG. 1, the trolley 200 may comprise audio and/or video capture means 236 provided with at least one video capture appliance, such as e.g. a camera, webcam and the like, and/or at least one audio capture appliance, such as e.g. a microphone.

Alternative embodiments of the capture means 236 cannot however be ruled out wherein the video capture appliance and the audio capture appliance are implemented in a single electronic device configured for audio and video capture. Conveniently, the camera 236 may be provided with a sensor, preferably an optical sensor, configured to detect, record, and/or count the drugs to be administered to a patient, or to automatically track the pickup or storage of a medicine from/into the trolley 200.

In one or more embodiments, the camera 236 is positioned superiorly to the scale 235 to record the weighed and picked-up drugs.

In one or more embodiments, the camera 236 is configured to record the activity performed by staff, such as e.g. the preparation and administration of therapies by nurses, for possible analysis and/or investigation.

In other words, the camera 236 continuously records, and therefore monitors, the activities carried out by the staff in order to verify the effective and regular performance thereof.

In one or more embodiments, the camera 236 is oriented to frame downwardly in the direction of the plate of the scale 235 and/or of the worktop 226 in order not to frame people's faces to maintain privacy of the same.

As shown in FIG. 1, the trolley 200 may comprise at least one audio/video reproduction device 237. Preferably, the display 237 is of the touch screen type. As will be appreciated later in the present description, the display allows an operator to perform various interfacing operations with the trolley 200 and/or the hospital's central healthcare ICT architecture.

Appropriately, the trolley 200 may comprise an operator identification system which is adapted to identify which operator is picking up a drug from the trolley 200, and the patient to whom the picked-up drug is administered. In actual facts, the identification system records the operator picking up a drug by, for example, scanning the operator's badge, the drug picked up by the operator, and the patient to whom the drug is administered by, e.g., scanning their medical record.

Figure 3:
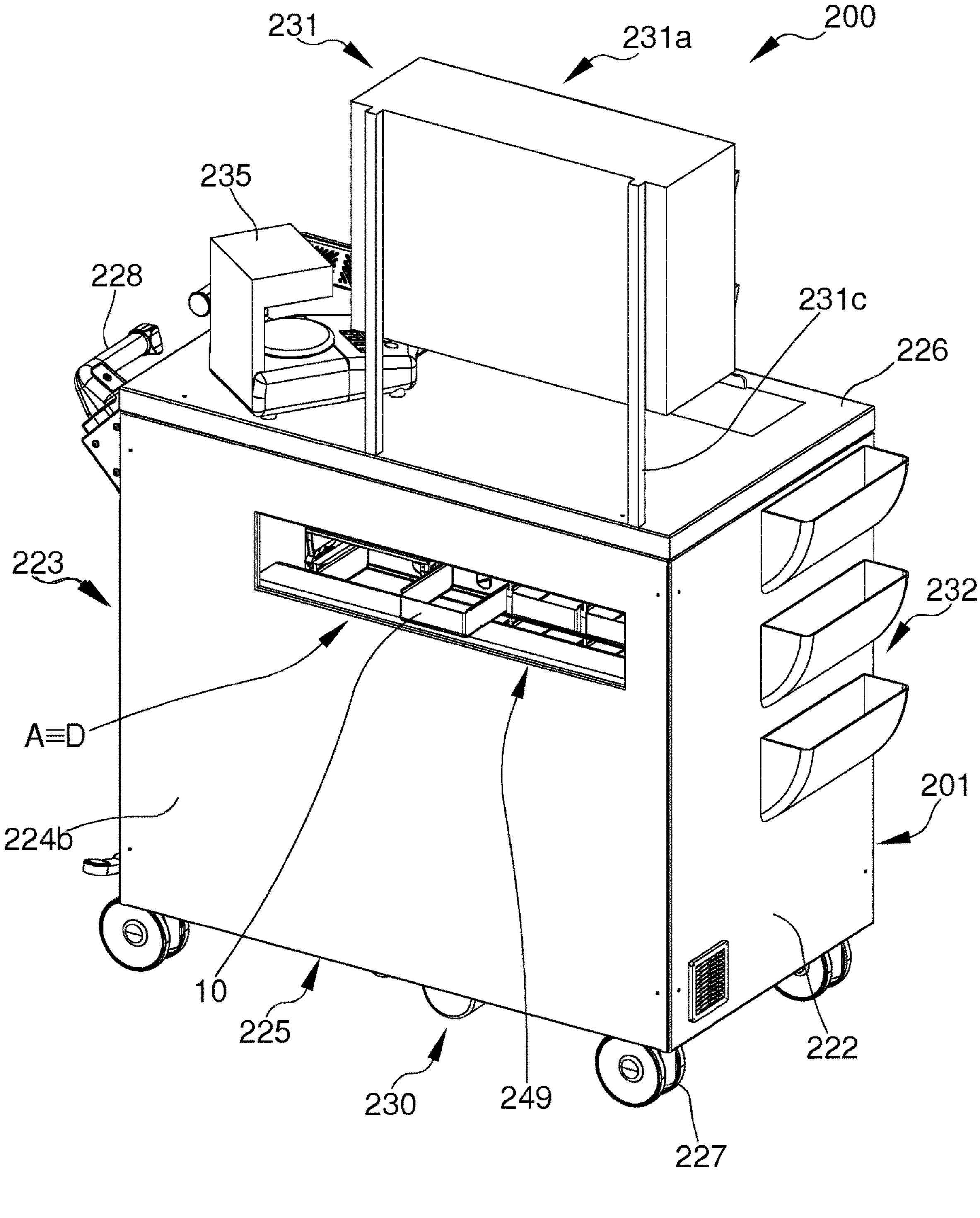
FIG. 3 is a perspective view from another side of the trolley in FIGS. 1 and 2, FIGS. 4, 5, 6, and 7 are detailed views of the housing compartment and of the trolley movement assembly in FIG. 1 in a sequence of drug dispensing movements.

As observable from FIGS. 1, 2 and 3, the trolley 200 defines at least one entry area A of at least one medicine into the trolley 200 and at least one exit area B of the medicine from the trolley 200.

Advantageously, the trolley 200 is provided with a movement assembly 240 arranged at least partly inside the housing compartment 221 and configured to move the medicine between at least one entry area A and one exit area B. Conveniently, as described in more detail below, the trolley 200 comprises at least one tray 10 configured to receive and contain at least one medicine.

The movement assembly 240 is provided with at least one shelf 241 adapted to receive and support the tray 10, preferably by means of a supporting surface 253. The use of a movement assembly 240 configured to move a certain type of tray 10 allows controlling the dispensing of drugs indirectly, thus avoiding the handling of containers and/or blister packs that usually have different shapes and sizes from drug to drug.

Further embodiments cannot however be ruled out wherein the shelf 241 is configured to directly move the medicines.

Additionally, the trolley 200 also has at least one storage area C for the storage of the tray 10 before being picked up by the movement assembly 240 to move it towards the exit area B. As described in detail in the remainder of this description, the storage area C is arranged at a suitable support 261 which is adapted to receive a tray 10.

Preferably, the trolley 200 comprises a plurality of storage areas C to store a large number of trays 10 inside the trolley 200, so as to allow healthcare providers to treat a large number of patients during the same ward route.

The movement of the trays 10 inside the ward trolley 200 occurs as follows: each tray 10 coming from the ward cabinet 100 is initially positioned at the entry area A and is inserted into the ward trolley 200 through an entry opening 249. The movement assembly 240 is intended to pick up and move the tray 10 from the entry area A towards the storage area C to store it in the housing compartment 221.

When an operator needs to pick up the drug contained in the tray 10, the movement assembly 240 is activated, e.g. by the processing means 238, to pick up the tray 10 from the storage area C and move it towards the exit area B, thus allowing the operators to pick up the medicines and dispense them to patients. Additionally, the movement assembly 240 is also configured to move the shelf 241 towards an unloading area D in which the shelf 241 is configured to interface with the cabinet 100 in order to deliver the tray 10 thereto. Such an operation is typically necessary in order to remove the empty trays 10 from the trolley 200 or to store in the trolley 200 only those trays 10 which are to be transported to the hospital ward. Preferably, the unloading area D coincides with the entry area A. Advantageously, the exit area B is positioned close to and/or substantially mating the worktop 226, thus allowing the operators to pick up the drugs stored inside the housing compartment 221 from a lifted, convenient and ergonomic position at all times, regardless of the amount of drugs already administered and of the remainder of the latter in the trolley 200. Preferably, the exit area B is arranged at a height above the ground comprised between 50 cm and 200 cm, preferably 100 cm.

In the embodiment shown in the figures, the exit area B is arranged at the point where the worktop 226 is located and preferably close to one of the side walls 224*a*, 224*b*, preferably the first side wall 224*a*.

Appropriately, the trolley 200 comprises at least one exit opening 242 arranged at the point where the exit area B is located and adapted to allow the medicine to exit the housing compartment 221. In this case, the exit opening 242 is formed on the worktop 226.

It cannot however be ruled out that the exit area B, and therefore the exit opening 242, may be arranged at the point where a different wall is located, such as e.g. the first side wall 224*a* in order to increase the flexibility of the trolley 200.

In particular, the exit opening 242 is made pass-through to allow the exchange of the tray 10, or a medicine, between the shelf/tray and/or the movement assembly 240 and the user.

Preferably, the exit opening 242 is pass-through for the passage of one tray 10 at a time.

Preferably, the exit opening 242 is pass-through for the passage of multiple trays 10 at a time.

In one embodiment, described in more detail below, the trolley 200 comprises a plurality of openings 242 (preferably two openings 242) at the point where the exit area B is located. This solution allows for increased speed of dispensing the drugs from the trolley 200 since, during the pickup by an operator of a drug from a first opening 242, the movement assembly 240 may move the tray towards the other opening, making the drug available for a subsequent pickup by the operator. Preferably, as shown in FIG. 2, the two openings 242 are arranged side by side to each other along the worktop 226.

To prevent the wrong drug from being accidentally picked up by the operators, the trolley 200 is provided with one or more closing elements 243 mounted at the point where each exit opening 242 is located for the selective closure of the latter. In particular, each closing element 243 is movable between an opening configuration, adapted to ensure access to the exit opening 242 and a closure configuration adapted to deny access to the exit opening 242. Preferably, when a closing element 243 is open, the other closing elements 243 are always closed. Preferably, the closing element 243 may be moved between the open position and the closed position manually and/or by means of suitable actuators.

Preferably, the closing element 243 is of the flap type. However, the possibility of using different closing elements, such as, e.g., of the shutter door or glazed type, etc., cannot be ruled out.

In one embodiment shown in FIG. 2, each exit opening 242 is formed on the worktop 226 in a position close to the first side wall 224*a*. In detail, the exit opening 242 is formed starting from the joining edge of the worktop 226 with the first side wall 224*a* and extends at least partly along the worktop 226.

In such an embodiment, preferably, the closing element 243 is of the shutter door type and is mounted in a sliding manner on the worktop 226 and on the side wall 224*a* of the trolley 200 to be movable between the closed position, wherein it covers the exit opening 242 by closing it, and the open position wherein it is partly arranged along the first side wall 224*a* to clear the exit opening 242. For this purpose, the trolley 200 comprises a pair of sliding guides (not shown) formed on the worktop 226 and on the side wall 224*a* which extend for a first stretch along the worktop 226 starting from the joining edge, by positioning on either side of the exit opening 242, and for a second stretch along the first side wall 224*a* starting from the joining edge. The closing element 243 is mounted in a sliding manner on the pair of sliding guides to be moved between the open position, wherein it is arranged on the worktop 226 to cover the opening 242, and the closed position wherein it is arranged along the first side wall 224*a* to clear the exit opening 242.

Conveniently, the processing means 238 are configured to control the opening/closing of the closing elements 243 in order to arrange for the opening of only one closing element 243 at a time, thus preventing the wrong drug from being picked up.

In one embodiment, the trolley 200 comprises a single exit opening 242 at the point where the exit area B is located and closable by multiple closing elements 243. In such a case, the exit opening 242 may have a width such that it can also simultaneously control multiple side-by-side trays 10 with the possibility for the operator to pick up the drugs from the tray or from multiple side-by-side trays by selectively opening the flaps 243.

Advantageously, the entry area A is arranged at the point where one of the side walls 224*a*, 224*b* is located and at a predefined height above the ground to allow the interface of the trolley 200 with one or more cabinets 100 for the storage and movement of the medicines. In particular, the entry area A is arranged at the point where only one of the side walls 224*a*, 224*b* of the trolley 200 is located, preferably the second side wall 224*b*. It cannot, however, be ruled out that the entry opening 249 be obtained on another wall of the trolley 200, e.g. the opposite wall.

Preferably, the entry area A is arranged at a height above the ground comprised between 50 cm and 150 cm, preferably 80 cm.

Appropriately, the entry opening 249 is positioned at the point where the entry area A is located and is adapted to allow the medicine to exit/enter the housing compartment 221. By means of the entry opening 249, the trolley 200 may interface with the cabinet 100 to receive and/or supply the trays from/to the cabinet 100.

In detail, since, as described above, the entry area A coincides with the unloading area D, the entry opening 249 allows the trolley 200 both to receive the trays 10 containing the drug from the cabinet 100 and to supply the latter with the empty trays 10.

The entry opening 249 is made pass-through to allow the exchange of the tray or of the medicine between the movement assembly 240 and the cabinet 100.

Preferably, the entry opening 249 is pass-through for the passage of one tray 10 at a time.

Preferably, the entry opening 249 is pass-through for the passage of multiple trays 10 at a time.

According to one embodiment, the trolley 200 has a single entry opening 249. According to a further embodiment, the trolley 200 has no more than one entry opening 249.

Figure 13:
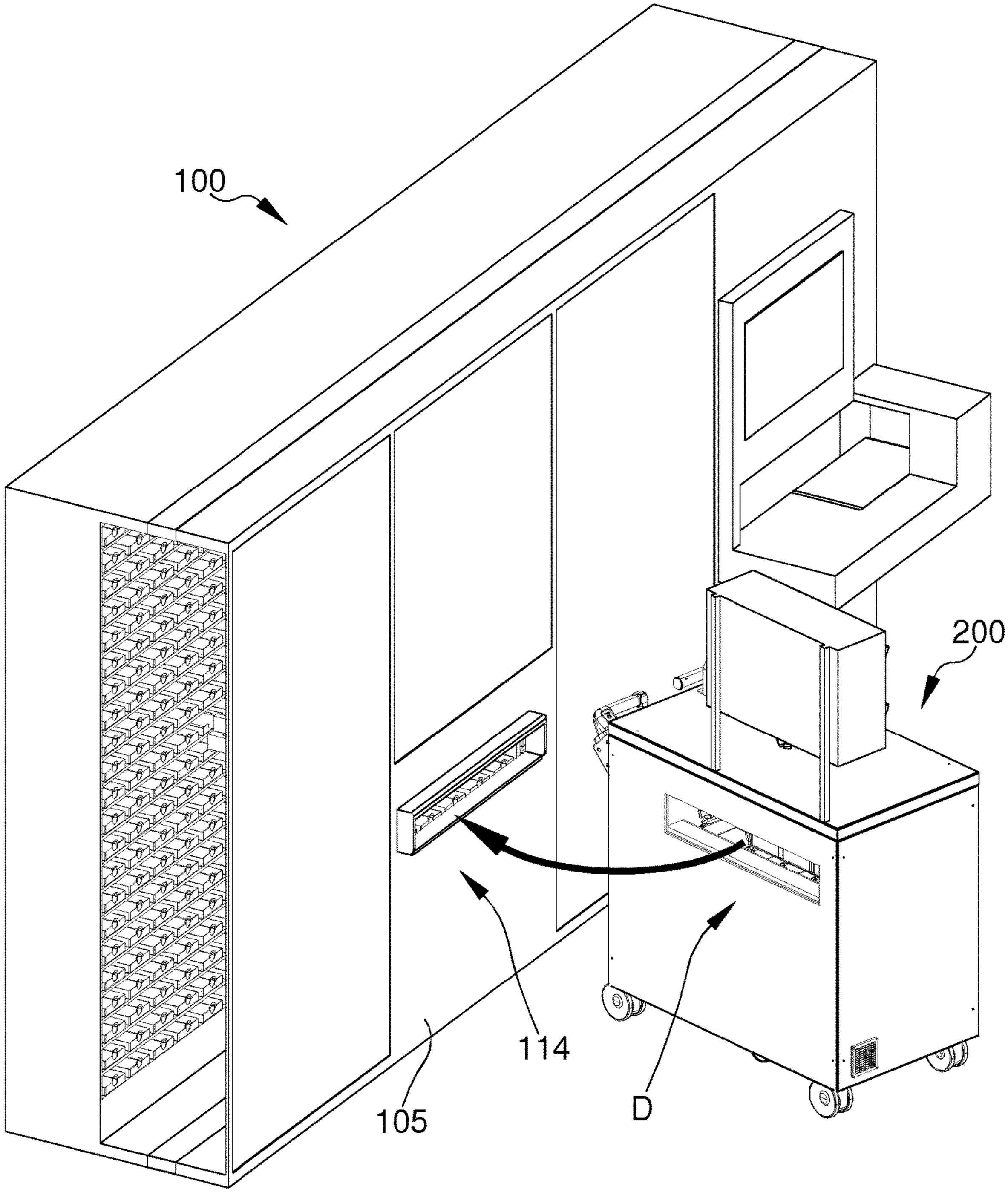
FIG. 13 is a perspective view of the trolley in FIG. 1 intended for interfacing with a ward cabinet and the movement of medicine holder trays.

Advantageously, thanks to the specific configuration of the trolley 200, the movement assembly 240 always moves the trays 10 towards a single entry area A, thus allowing the interface of the trolley 200 with one or more cabinets 100 for the storage and movement of medicines. In particular, as observable in FIG. 13, the cabinet 100 is provided with a single opening 114 formed on its front wall 105 and intended for the passage of one medicine holder tray 10 at a time. For this purpose, the cabinet 100 is provided with a manipulator (not shown) configured to transfer the trays 10. The manipulator operates by shifting towards the trolley 200 by extending beyond the front wall 105 of the cabinet 100 to at least partly pass through both the opening 114 of the cabinet 100 and the entry opening 249 of the trolley 200. Once the tray 10 has at least partly entered the trolley 200, the manipulator releases the tray 10 onto an appropriate support 261 to be picked up by appropriate interfacing means 250 of the trolley 200 which take over the tray 10 for its subsequent storage inside the trolley 200.

In one embodiment, a conveyor belt may be provided which is arranged at the opening 114 of the cabinet 100 and is adapted to be at least partly inserted into the trolley 200 through the entry opening 249. The manipulator of the cabinet 100 may thus arrange the trays 10 on the conveyor belt which, in turn, moves them inside the trolley 200 to position them on the support 261.

Conveniently, the entry opening 249 of the trolley 200 and the opening 114 of the cabinet 100 are arranged at the same height above the ground to allow the transfer of the trays 10 from the cabinet 100 to the trolley 200, and/or vice versa. As can be observed, the entry opening 249 of the trolley 200 may have a width such that it can also simultaneously control multiple trays 10 side by side. It follows that the dimension of the opening 114 of the cabinet 100 may also be sized in a complementary manner and substantially similarly to the dimension of the entry opening 249 of the trolley 200. In such a case, the trolley 200 comprises multiple entry areas A and one or more movement assemblies 240 configured to receive the trays 10 from the entry areas A and to move them inside the housing compartment 221.

It cannot however be ruled out that the entry opening 249 may have a height that can also simultaneously control multiple trays 10 stacked one on top of the other. As observable from FIG. 13, the cabinet 100 has a plurality of cells, overlapping and side-by-side with each other, each cell storing a single tray 10. Each cell is provided with a pair of grooves or tracks adapted to receive the side edges of the tray 10 to support it.

It is useful to note that each tray 10 may contain medicines of various shapes and sizes, resulting in the need to have different sized storage spaces inside the cabinet.

In order to optimize the space inside the cabinet 100, preferably, the cells are positioned along the vertical direction with a predefined pitch substantially corresponding to the minimum height which can be occupied by a tray 10 containing a medicine. Obviously, in the case of trays containing drugs having greater height than the height of the single tray, a predefined number of cells may be left free, so as to store also trays 10 occupying greater heights than the predefined pitch.

Conveniently, the manipulator of the cabinet 100 may comprise a sensor capable of detecting the height of the tray 10 containing the drug, preferably discriminating those trays 10 having heights from 50 mm to 100 mm, so as to allow the cabinet 100 to optimize the storage of the trays 10.

Advantageously, as anticipated above, the trolley 200 comprises at least one tray 10 associable with the shelf 241 in a removable manner and configured to receive and contain one or more medicines. In actual facts, the medicines are placed inside the tray 10 and the trolley 200 is configured to pick up, store and distribute the tray 10.

The use of the tray 10 is particularly advantageous in that it allows the drugs of different sizes and formats to be moved inside the trolley 200 indirectly, i.e. without handling the containers and/or blister packs, but by only acting on the tray 10. By means of this expedient, the trolley 200 may be configured to move only standard-sized trays, which is easy to do and inexpensive.

Figure 10:
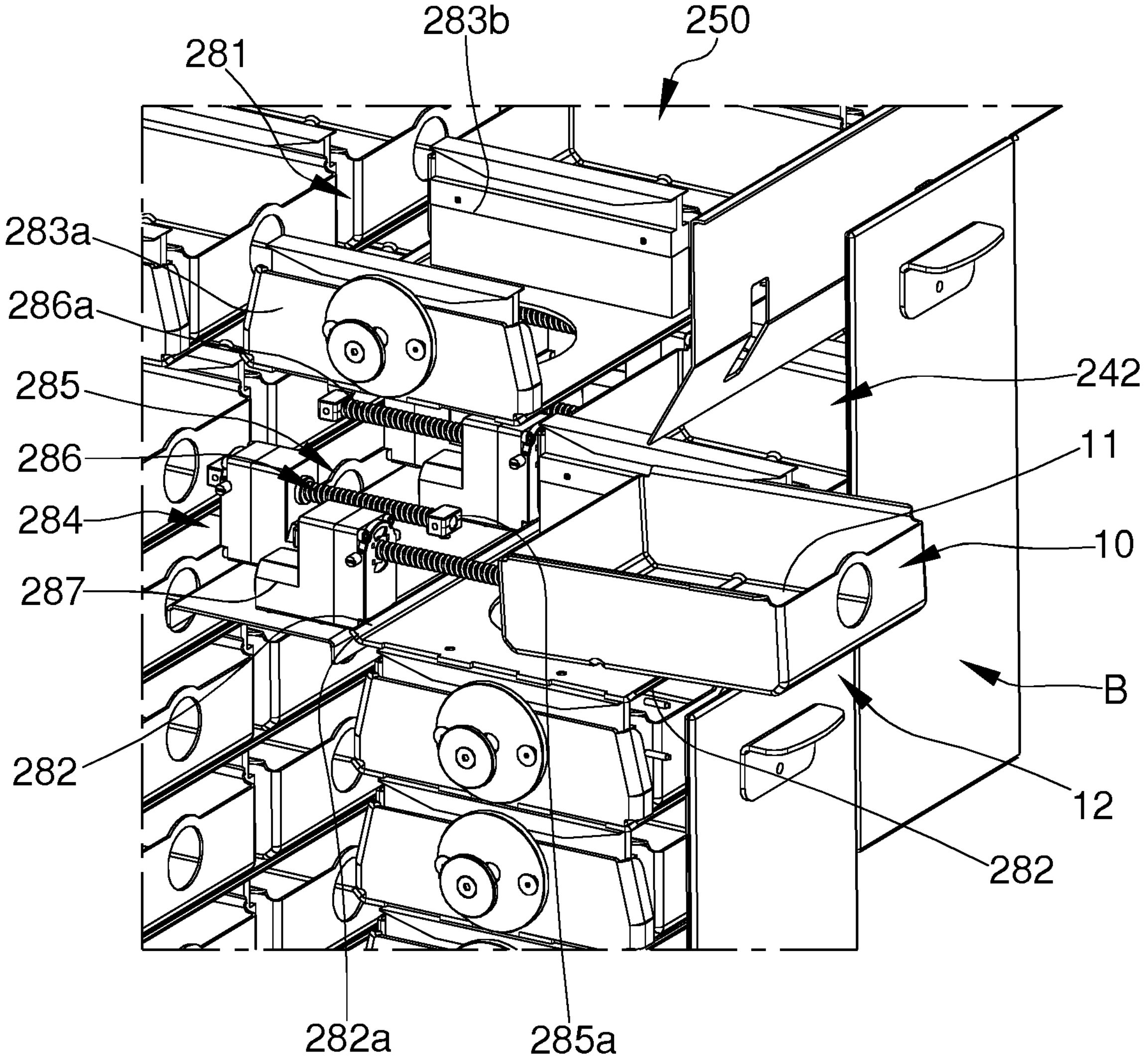

As shown in FIG. 10, the tray 10 comprises a base 11, which serves as a support for one or more medicines, bounded peripherally by walls that rise from the base for a predetermined height. Preferably, the walls are four, facing two by two. Preferably, the trays 10 have a length comprised between 5 cm and 90 cm, preferably 19 cm, a width comprised between 5 cm and 90 cm, preferably 14 cm, and a height comprised between 0.5 cm and 20 cm, preferably 5 cm.

In one embodiment, the trays 10 may have two predefined widths. In detail, a first group of trays 10 has a width comprised between 5 cm and 18 cm, preferably 12 cm to accommodate standard-sized packages of drugs, while a second group of trays 10, according to the above, has a width comprised between 10 cm and 30 cm, preferably 19 cm to accommodate larger packages of drugs. Different or additional embodiments with groups of trays of different sizes cannot however be ruled out in order to expand the housing possibilities for even more types of packages.

These dimensions allow the trays 10 to receive most formats of drugs available on the market, thus allowing the trolley 200 to control the storage and dispensing of a high quantity and variety of drugs quickly and easily.

Preferably, the base 11 of the tray 10 comprises a lower surface 12 intended to be arranged in contact with the shelf 241. Preferably, for this purpose, the lower surface 12 of the tray 10 has a shape substantially complementary to the shelf 241.

Conveniently, the trays 10 are shaped in such a way that several trays 10 can be stacked one on top of the other.

Advantageously, each tray 10 comprises an identifier element which, as will be described in detail later in this description, allows for the creation of a univocal association between the tray 10 and one or more medicines to be administered to one or more patients. For example, the identifier element may be a tag, an RFID code, a QR code, or the like.

According to one embodiment, conveniently, the trolley 200 comprises a plurality of movement assemblies 240, preferably aligned with each other along the axis X.

Preferably, each movement assembly 240 may be configured to handle a specific type of tray 10.

It cannot however be ruled out that a movement assembly 240 may be configured to handle a plurality of types of trays 10.

Conveniently, the trolley 200 is configured to arrange for the dispensing from the exit opening 242 of the drugs moved by only one movement assembly 240 at a time, to prevent the wrong drug from being accidentally picked up by the operators.

Conveniently, the trolley 200 comprises a closing element for each movement assembly 240.

Figure 8:
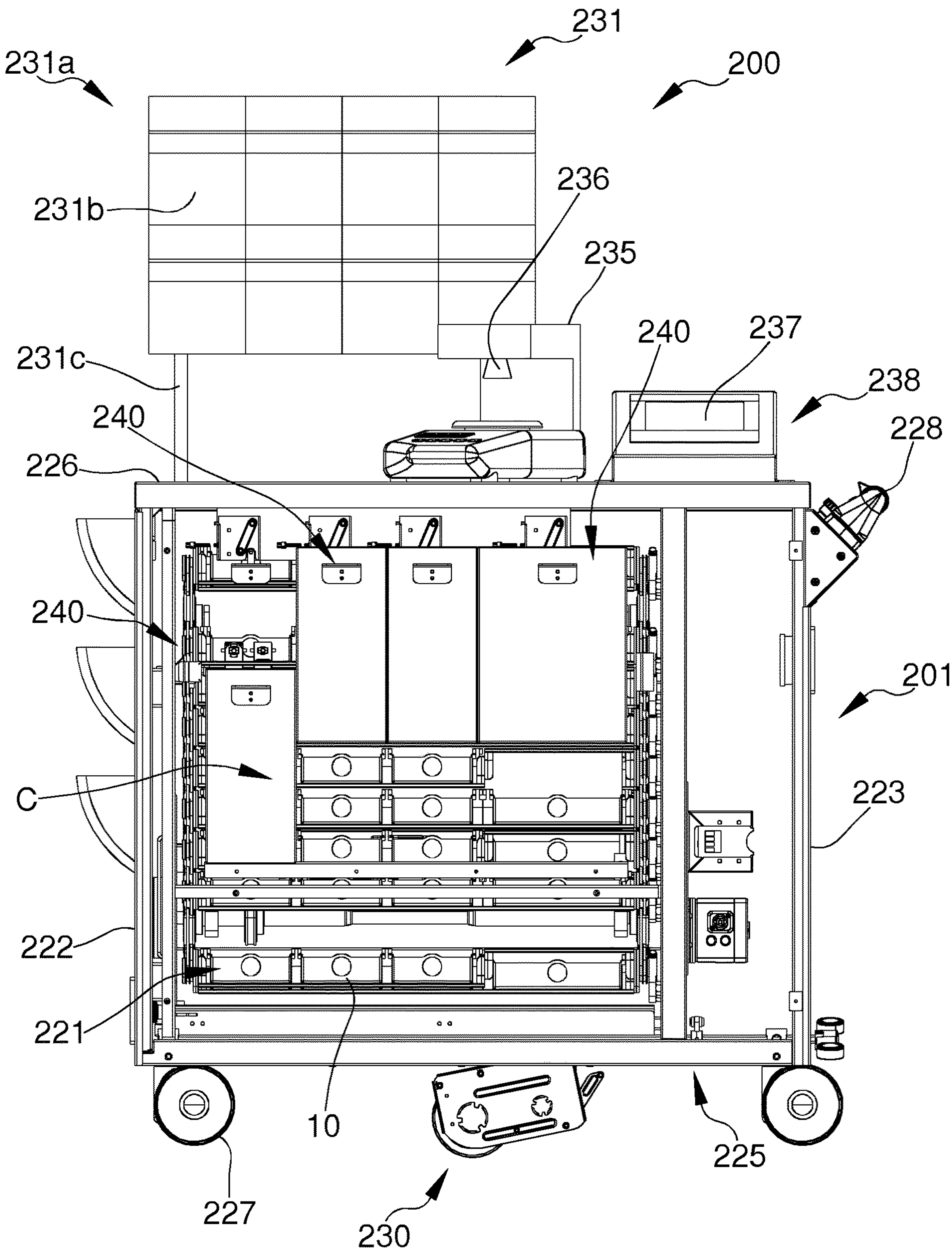
FIG. 8 is a side cross-sectional view of the trolley in FIG. 1.

In the embodiment shown in FIG. 8, wherein there are four movement assemblies 240, the trolley 200 has four closing elements, each arranged to close the exit opening 242 at the point where the exit area B of the respective movement assembly 240 is located.

In one or more embodiments, the trolley 200 may be provided with a single exit opening 242 through which the drugs moved by the movement assemblies 240 come out. In such an embodiment, a plurality of exit areas can be identified along the exit opening 242, side by side, through each of which a drug moved by a single movement assembly 240 is intended to come out.

Conveniently, each closing element is arranged to close one of the exit areas in order to selectively control the pickup of the drugs.

Appropriately, the movement assembly 240 comprises movement means 244 operatively connected to the shelf 241 to move it at least between the entry area A, the storage area C and the exit area B.

Advantageously, the trolley 200 comprises interfacing means 250 configured to operate in a receiving configuration, wherein they are adapted to receive the tray 10 to arrange it on the shelf 241, and a release configuration wherein they are adapted to release the tray 10 from the shelf 241 to arrange it, e.g., at the point where the exit area B is located.

Preferably, the interfacing means 250 are configured to constrain the tray 10 to the shelf 241 at least during its movement inside the housing compartment 221. According to the embodiment shown in FIGS. 4-7, advantageously, the movement assembly 240 is configured to move the drugs inside the trolley 200 between the various areas A, B, C, and D along mainly straight directions.

In particular, the movement means 244 are of the type of a Cartesian robot and are configured to make the shelf 241 shift along at least one first vertical axis Y and along at least one second axis X transverse to the first axis Y. The movement means 244 are arranged in the housing compartment 221 in a position between the first side wall 224*a* and the second side wall 224*b* so as to be able to pick up the trays 10 from the input area A, placed at the point where the second side wall 224*b* is located, and move them towards the exit area B, placed at the point where the worktop 226 is located and close to the first side wall 224*a*.

Preferably, the first and second axes X, Y are arranged substantially vertically and horizontally respectively, thereby allowing the shelf 241 to be moved in a substantially vertical plane X, Y.

Even more preferably, the axes X, Y are arranged substantially parallel to the side walls 224*a*, 224*b* of the trolley 200.

This configuration allows for the efficient movement of the tray 10 inside the trolley 200 between the entry area A, the storage area C and the exit area B. Appropriately, the movement means 244 comprise at least one first and one second straight guides 245, 246 arranged substantially parallel to the first and to the second axes X, Y, respectively. Preferably, the first and the second straight guides 245, 246 are sliding with respect to each other and the shelf 241 is mounted in a sliding manner on at least one of either the first or the second straight guides 245, 246.

Preferably, the shelf 241 is mounted in a sliding manner on the second straight guide 246, i.e. on the horizontal guide, and the latter is mounted in a sliding manner on the first straight guide 245, i.e. on the vertical guide.

It cannot, however, be ruled out that the shelf 241 may be mounted on the vertical guide 245 and the latter be mounted on the horizontal guide 246 or that the shelf 241 may be mounted on both straight guides 245, 246 in a sliding manner.

Preferably, the movement means 244 may comprise a third straight guide, not shown in the figures, arranged parallel to an axis Z transverse to the axes X and Y and on which one of either the first or the second straight guides 245, 246 is mounted in a sliding manner.

Conveniently, the movement means 244 comprise a pair of vertical guides 245*a*, 245*b*, the first 245*a* and second vertical straight guides 245*b*, respectively, between which the horizontal guide 246 extends and they are adapted to support the latter in a sliding manner.

Conveniently, the movement means 244 comprise at least one actuator, such as e.g. a motor, operatively connected to the shelf 241 by means of at least one belt drive element 247 to move it along at least the horizontal guide 246. Furthermore, the movement means 244 comprise a second actuator operatively connected to the horizontal guide 246 by means of a second belt drive element 248 to move it along the vertical guide 245.

In detail, the second belt drive element 248 extends along one of the vertical straight guides 245*a*, 245*b*, preferably the second vertical straight guide 245*b*, and is closed on itself to wrap around at least one pair of movement pulleys arranged, preferably, substantially at the point where the ends of the vertical straight guide 245*b* are located. The actuator is operatively connected to at least one of the movement pulleys to move the second belt drive element 248 in rotation.

On the other hand, the first belt drive element 247 extends at least partly along the first vertical straight guide 245*a* and at least partly along the horizontal straight guide 246. In detail, the first belt drive element 247 is closed on itself to wrap around at least one pair of movement pulleys arranged substantially at the points where the ends of the first vertical straight guide 245*a* are located and at least one pulley mounted on the horizontal straight guide 246 in the proximity of the second vertical straight guide 245*b*. In addition, a pair of pulleys are provided which are adapted to arrange at least one stretch of the belt drive element 247 substantially parallel to the horizontal straight guide 246. For this purpose, these pulleys are mounted on the horizontal straight guide 246 in the proximity of the first vertical straight guide 245*a* and are arranged vertically aligned with each other so that the belt drive element 247 can slide between them, thus extending by at least one stretch parallel to the horizontal straight guide 246.

In summary, by rotating the first and the second drive elements 247 around the corresponding pulleys, it is possible to move the shelf 241 along a horizontal direction and the horizontal straight guide 246 along a vertical direction, respectively.

It is useful to note that a vertical displacement of the horizontal straight guide 246 generates a rotation of the first drive element 247 which in turn causes a displacement of the shelf 241 along the horizontal direction. This displacement is taken into account by the processing means 238 to calculate the actual rotation to be imparted to the belt drive elements 247, 248 to move the shelf 241 to the desired position.

Preferably, the actuators are positioned at the bottom of the trolley 200.

Further embodiments of the movement assembly 240 cannot however be ruled out wherein, e.g., the movement means 244 are made by means of different solutions to move the shelf 241 inside the housing compartment 221 with three, four or more degrees of freedom.

For example, in one embodiment, the movement means 244 may comprise one or more robotic arms having an operation of the SCARA type ("*Selective Compliance Assembly Robot Arm*") configured to move the tray 10 along directions parallel to the axes X, Y, and Z. In detail, the movement means 244 may comprise at least one kinematic chain associated with the shelf 241. Preferably, the kinematic chain comprises a plurality of arms connected to each other by means of kinematic pairs which allow the shelf 241 to be moved inside the housing compartment 221 along directions parallel to the axes X, Y, and Z and supported, if necessary, by rotational means.

In one embodiment, the kinematic chain comprises one arm connected to the trolley 200 by means of a lower pair having a substantially horizontal axis of rotation. The shelf

241 is mounted on the arm in a sliding manner in order to be moved along the longitudinal direction of extension of the latter.

In addition, the arm extends inside the housing compartment 221 by a predefined length such as to allow the shelf 241 to reach the various storage areas.

In order to pick up a given tray 10 arranged in a given storage area C, the arm is rotated around the axis of rotation so as to arrange a portion thereof in a position close to the storage area C. Subsequently, the shelf 241 runs along the arm to reach such portion, thereby arranging itself close to the tray 10 to be picked up. In one embodiment, the kinematic chain comprises a first arm connected, at a first end, to the trolley 200 by means of a lower pair having a substantially horizontal axis of rotation. Preferably, the first end is constrained to the trolley 200 at the center of the housing compartment 221 so that the first arm may rotate completely around the axis of rotation. The second end of the first arm is connected to a second arm by means of a second lower pair. The second arm is in turn connected to the shelf 241 to move it inside the housing compartment 221.

Figure 4:
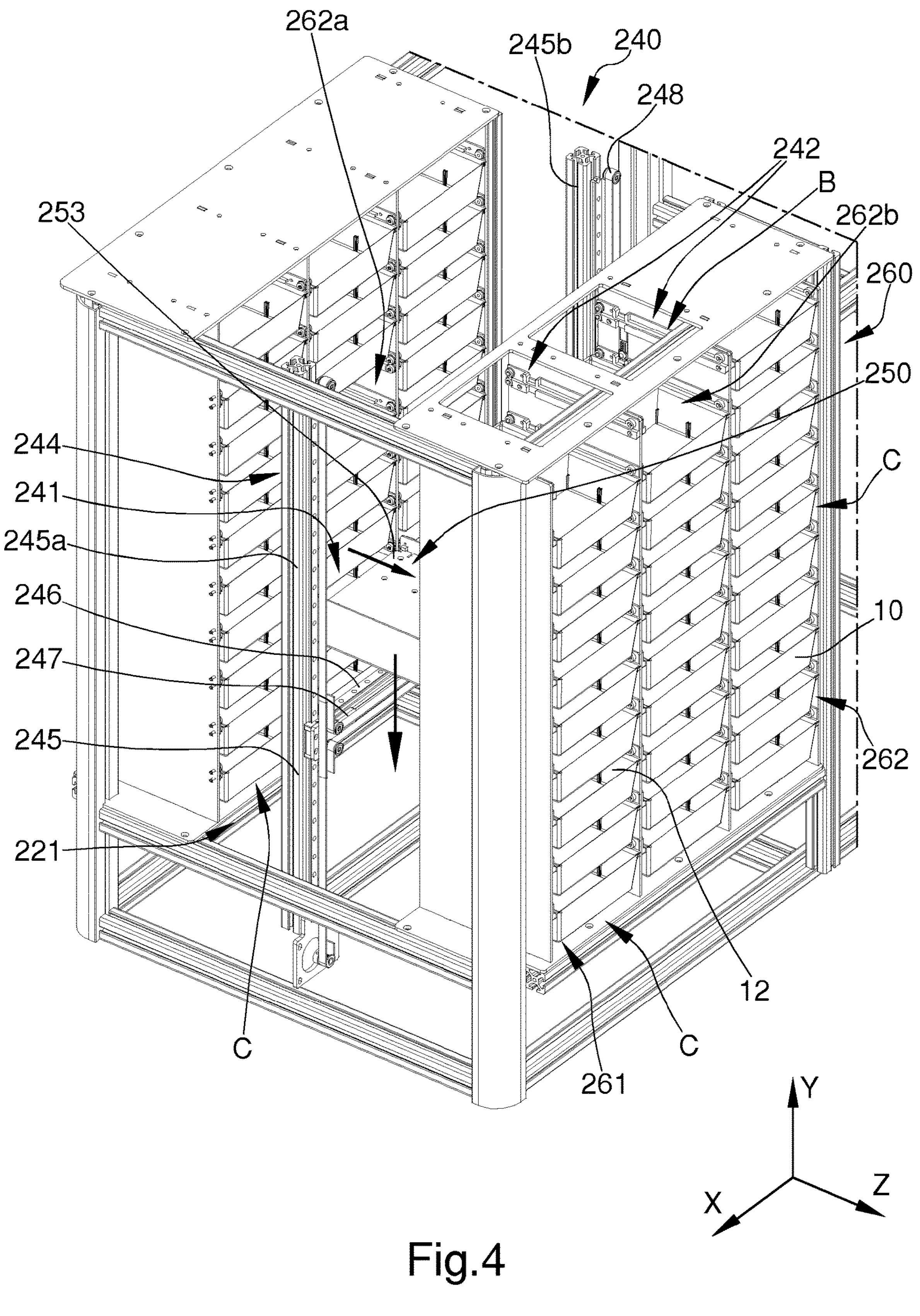

As can be observed from FIG. 4, the trolley 200 comprises at least one storage structure 260 arranged internally to the housing compartment 221 and provided with a plurality of supports 261, each support 261 being associable with at least one tray 10 and arranged at the point where the storage area C is located. In this case, each support 261 is associable with a single tray 10. Other embodiments cannot however be ruled out wherein each support 261 is associable with multiple trays 10 at the same time.

In this case, the supports 261 are arranged stacked one on top of the other and side by side along directions substantially parallel to the axes X, Y.

According to one embodiment, the supports 261 may comprise storage cells 262 configured to house one or more trays 10 inside them or shelves arranged one on top of the other wherein the trays 11 are laid side by side.

Conveniently, the trolley 200 comprises a first and a second storage structure 260 arranged facing and spaced apart from each other to make a gap inside which the movement assembly 240 is arranged to dispense and pick up the trays 10.

Preferably, the first storage structure 260 is arranged side by side with respect to the first side wall 224*a* and the second storage structure 260 is arranged side by side with respect to the second side wall 224*b*.

Figure 5:
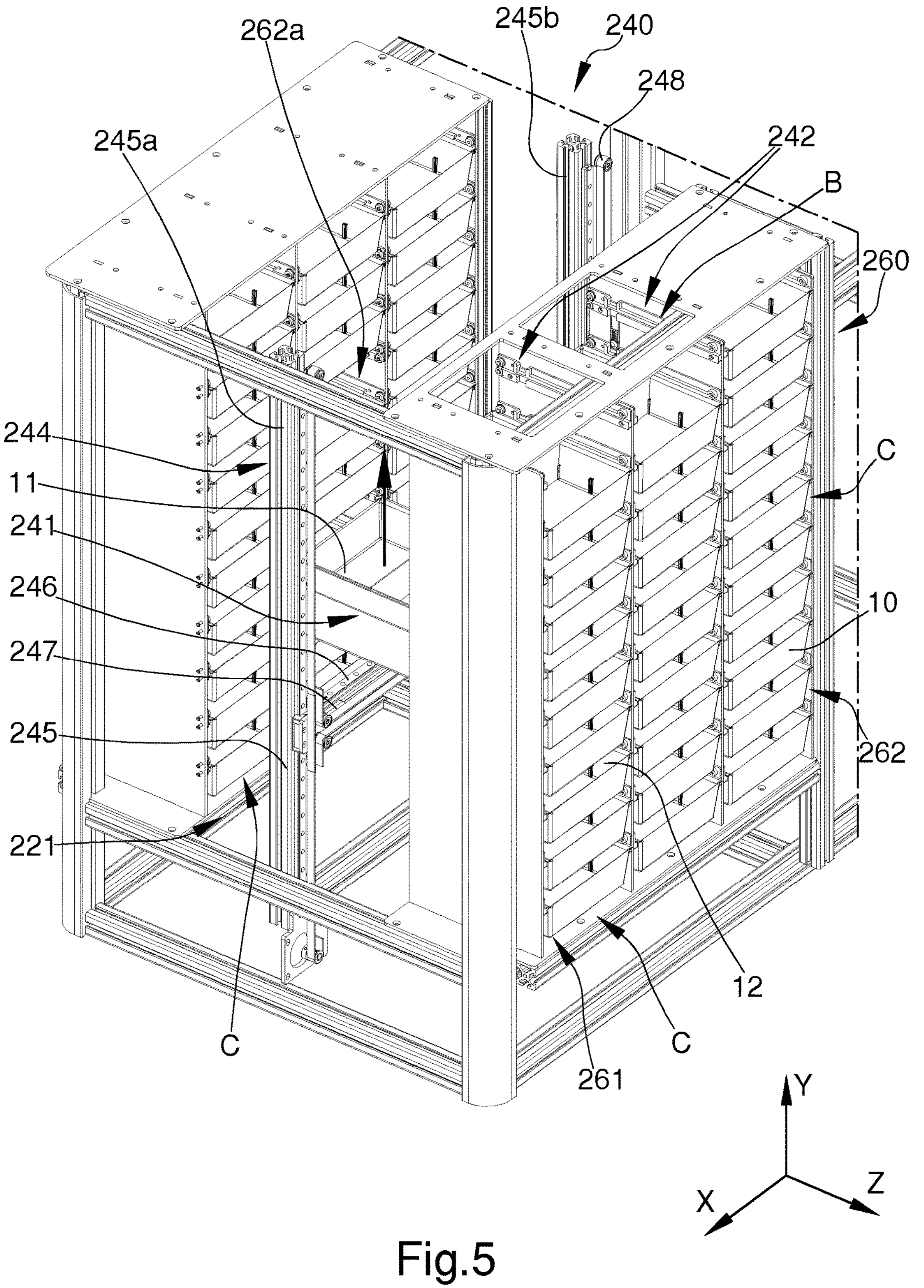

As observable from FIG. 5, the storage structure 260 is provided with at least one free cell 262*a* arranged facing the exit opening 242. Such a free cell 262*a* is made pass-through to allow the interfacing means 250 to reach the entry opening 249 and receive the tray 10.

Conveniently, one of either the first or the second storage structures 260, preferably the second storage structure 260, has one or more pickup cells 262*b* adapted to receive a tray 10 intended to be picked up by the operator. The pickup cells 262*b* are arranged at the point where the exit area B is located and facing at least one exit opening 242.

For this purpose, the exit opening 242 is obtained pass-through towards a pickup cell 262*b* so that the operator can pick up the tray or the drug placed in such a pickup cell 262*b*.

According to the embodiment shown in FIG. 4, the storage structure 260 comprises a pair of pickup cells 262*b* arranged side by side and close to the worktop 226.

Figure 9:
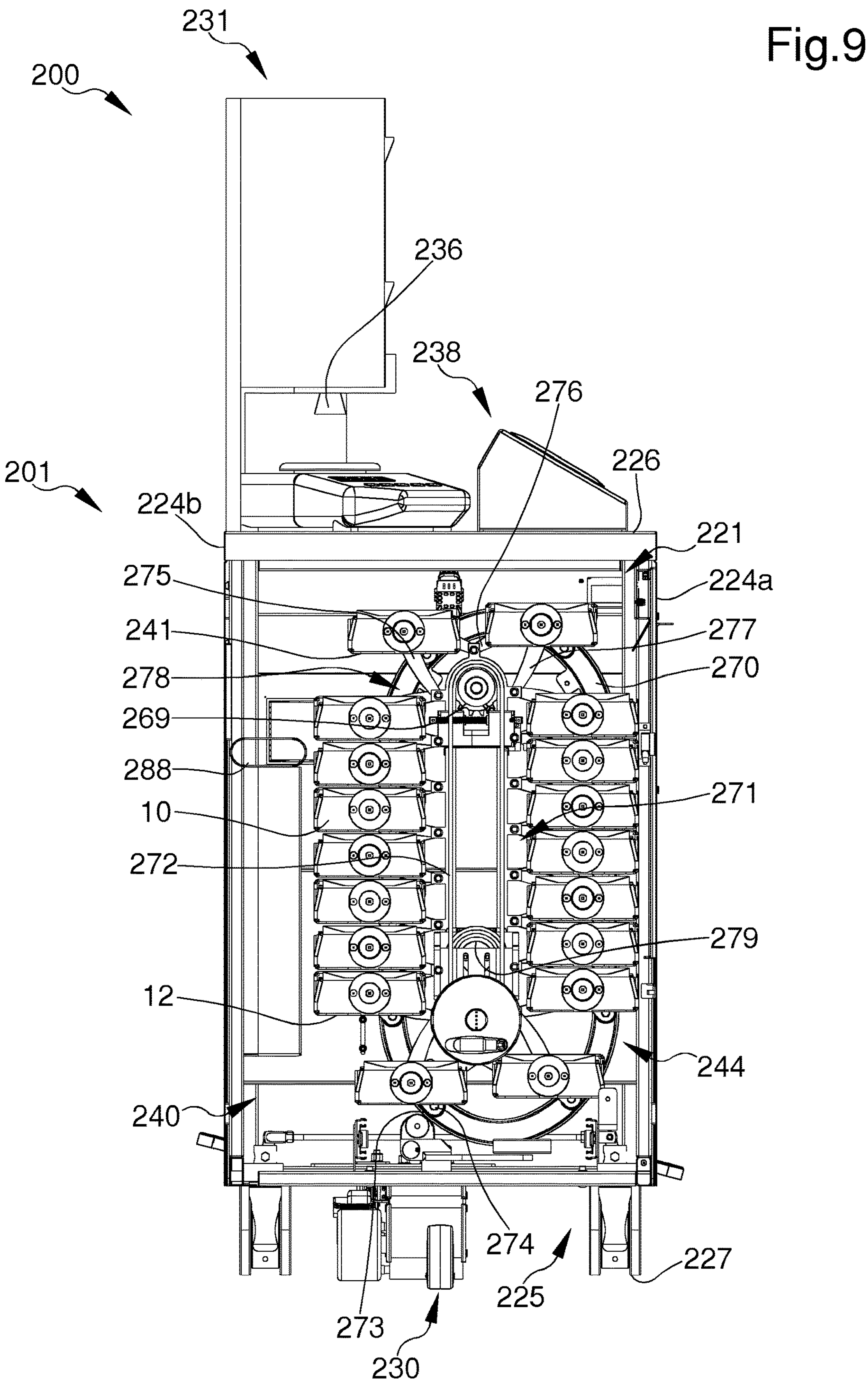
FIG. 9 is a front cross-sectional view of the trolley in FIG. 1 wherein the movement assembly is visible.

According to the embodiment shown in FIGS. 8 and 9, the movement means 244 comprise a guide 270, on which one or more shelves 241 are engaged in a sliding manner, configured to guide the motion of the shelf 241 inside the housing compartment 221 along a circular movement trajectory. To this end, the movement means 244 are provided with a drive system 271 which imparts motion to each shelf 241 along the guide 270. As will be described in detail later in the present description, the drive system 271 is implemented so that each shelf 241 is connected to a belt drive member 272. The possibility cannot however be ruled out that the guide 270 and the drive system 271 be a single movement element/device.

Preferably, the guide 270 is a track on which the shelves 241 are constrained in a sliding manner by means of a special rotational-mechanical coupling. In detail, each shelf 241 is connected to the track 270 by means of a skid 273 provided with its own bearing 274 thanks to which it is possible to make the shelves 241 slide along the trajectory defined by the track 270. Additionally, each skid 273 is pivoted simultaneously to the shelf 241 and to a fork 275. The fork 275 in turn serves as a connection between the respective shelf 241 and the drive member 272. The fork 275 is provided with two mutually movable arms 276, 277 which bifurcate from a vertex. In particular, the fork 275 rotates around its own axis of rotation passing through the vertex where the skid 273 and the shelf 241 are pivoted.

Conveniently, the shelf 241 is connected to the fork 275 at its own vertex by means of a lower pair, preferably idle, which allows it to rotate around the axis of rotation transverse to the plane of movement of the shelf 241. In addition, the arms 276, 277 are pivoted in turn to the drive member 272 in order to rotate around respective axes of rotation substantially parallel to the axis of rotation passing through the vertex. Such a configuration allows the fork 275 to adapt to the variation in curvature of the drive member 272 and, at the same time, maintain the shelf 241 in a substantially horizontal position at all times.

It should be specified that the fork 275 is a particular connection means 278 of the shelf 241 to the drive system 271; this does not detract from the possibility of having different connection means 260 the operation of which is similar to that of the fork 275 described above.

As shown in FIG. 9, the track 270 has a circular shape closed on itself to move the shelf 241 on a rotational plane. Such a conformation allows for the movement of each shelf 241 towards the exit area B or the entry area A, while maintaining the other shelves 241 stored inside the housing compartment 221, regardless of the quantity of drugs already administered and of the remainder of those drugs in the trolley 200.

Conveniently, the track 270 runs mainly vertically to move the shelves 241 on a substantially vertical plane of movement. Furthermore, the track 270 is arranged transverse to the direction of forward movement of the trolley 200. In other words, the track 270 extends in height between the base 225 and the worktop 226, and in width between the first side wall 224*a* and the second side wall 224*b*. This expedient allows the pickup/loading of the medicine from an always elevated position while using as much space as possible to store the medicines in the housing compartment 221.

In detail, the shape of the guide 270 is circular or oval and allows the shelves 241 to be moved between different positions by guiding them along a predefined trajectory and along a single direction of rotation, thus reducing the costs of implementation and maintenance of the movement means 244.

Preferably, the shelves 241 are moved from the entry area A to the exit area B in a counterclockwise direction and/or vice versa.

Preferably, the trolley 200 is provided with four movement assemblies 240 side by side with the planes of rotation parallel to each other. It cannot, however, be ruled out that the trolley 200 may be designed to contain more or fewer movement assemblies 240 depending on operational requirements.

As shown in FIG. 9, the motion drive system 271 comprises at least one driving pulley 279, set in rotation by direct coupling to an actuator, and at least one idler pulley 269.

As anticipated above, the drive system 271 comprises a drive member 272, closed on itself in a loop to wrap around the pulleys 279, 269, and to which the shelf 241 is connected. The drive member 272 may be, e.g., a belt, a chain, a cable, or any flexible tie rod.

In particular, the pulleys 279, 269 are arranged one on top of the other and aligned in a plane substantially parallel to the plane of movement of the shelf 241. In addition, the axes of rotation of the pulleys 279, 269 are arranged transversely to the plane of movement of the shelf 241.

In detail, the plane of movement is substantially vertical and the axes of rotation are arranged substantially horizontally.

Preferably, the driving pulley 279 is arranged inferiorly to the idler pulley 269. Preferably, the drive system 271 is arranged at least partly inside the perimeter described by the track 270. In other words, the drive system 271 is at least partly circumscribed by the track 270.

Figure 6:
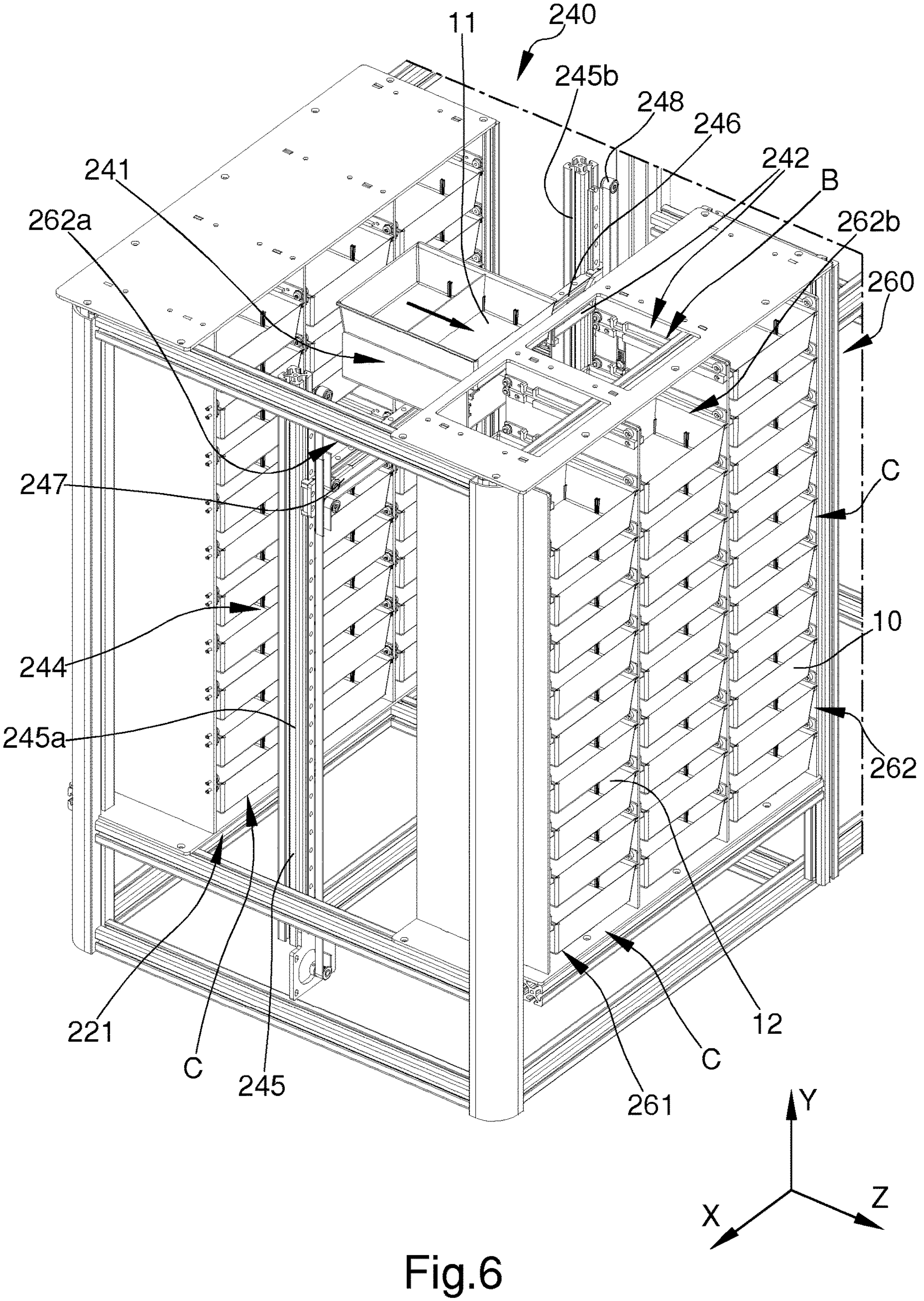
Figure 7:
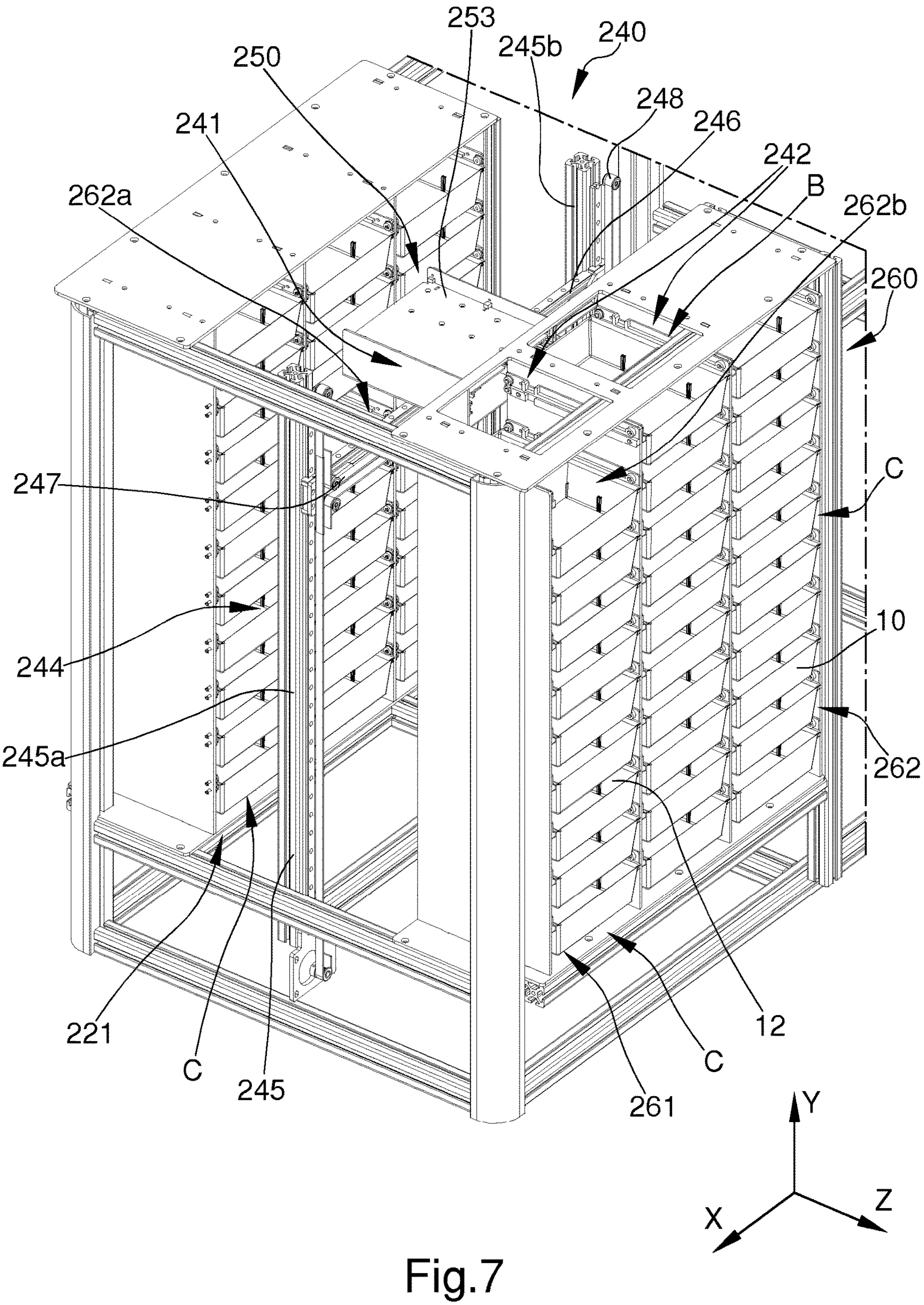

According to one embodiment shown in FIGS. 6 and 7, the interfacing means 250 are configured to move the supporting surface 253 of the shelf 241 along a direction parallel to the axis Z between an interfacing position, wherein the supporting surface 253 protrudes from the shelf 241 to receive in support or to deliver the tray 10, and a constraining position wherein the supporting surface 253 is retracted into the shelf 241 to constrain it to the latter.

To this end, preferably, the supporting surface 253 is mounted on the shelf 241 in a sliding manner and the interfacing means 250 comprise an actuator, not shown in the figures, operatively connected to the supporting surface 253 to move it between the constraining position and the interfacing position, and/or vice versa.

Conveniently, the supporting surface 253 is movable along the axis Z towards both the first side wall 224*a* and the second side wall 224*b*.

Advantageously, the interfacing means 250 comprise forward movement means arranged on the supporting surface 253 to move the trays 10 with respect to the supporting surface 253 along the axis Z, thereby making a univocal association between the tray 10 and the supporting surface 253 allowing the latter to be received and/or delivered by/from the shelf.

As anticipated above, the interfacing means 250 operate in a receiving configuration when the shelf 241 is positioned at the point where a tray 10 to be picked up is located, e.g. in the proximity of the entry area A or of the storage area C, and in a releasing configuration when the shelf 241 is positioned at the point where the exit area B or the storage area C are located.

In a receiving configuration, the interfacing means 250 move the supporting surface 253 to the interfacing position, arranging it at least partly below the tray 10. At this point, the forward movement means are activated, which move the tray 10 to fully place it on the supporting surface 253. Finally, the supporting surface 253 is moved to the constraining position to constrain the tray 10 to the shelf 241, thereby allowing it to be moved inside the housing compartment 221. In the releasing configuration, the interfacing means 250 move the supporting surface 253 on which a tray 10 is placed towards the area wherein the tray 10 is to be released. At this point, the forward movement means are activated to release the tray 10, by placing it in the releasing area.

According to one embodiment not shown in the figures, the interfacing means 250 comprise a pair of gripping elements of the type of movable grippers towards and away from each other to grasp, preferably, a single tray 10. Other embodiments cannot however be ruled out wherein the interfacing means 250 are configured to move multiple trays 10 at the same time.

Conveniently, the interfacing means 250 may comprise a blocking assembly mounted on the shelf 241 to constrain, preferably in a removable manner, the tray 10 to the shelf 241.

As shown in FIGS. 10, 11 and 12, the interfacing means 250 comprise an anchoring system 281 configured to anchor the tray 10 to the shelf 241 in a removable manner in order to store it in the trolley 200. In actual facts, the anchoring system 281 is configured to constrain the tray 10 to the shelf 241 during at least the movement inside the trolley 200 and release the tray 10 when it is in the exit area B to allow it to come out of the exit opening 242.

Conveniently, the anchoring system 281 comprises at least one abutment element 282 arranged on the shelf 241 and configured to abut against the tray 10 in order to prevent accidental reciprocal movement of the tray 10 on the shelf 241 when moved.

In detail, in use, the abutment element 282 is arranged frontally to the tray 10 when the latter is leaning against the shelf 241. In particular, the abutment element 282 is arranged transversely to the plane of movement of the shelf 241. Conveniently, the abutment element 282 protrudes cantilevered from the shelf 241 by a predefined height less than the height of the tray 10 so as to allow the insertion and removal of the latter into/from the shelf 241.

In one or more embodiments, the abutment element 282 comprises at least one edge 82*a* of the shelf 241 raised with respect thereto.

Conveniently, the anchoring system 281 comprises a pair of abutment elements 282 arranged, in use, frontally and backwardly with respect to the tray 10. In particular, the abutment elements 282 are arranged transversely to the plane of movement of the shelf 241 to block the displacement of the tray 10 along a direction parallel to the plane of movement.

Additionally, the anchoring system 281 comprises a pair of side boards 283*a*, 283*b* arranged, in use, on either side of the tray 10. More specifically, the side boards 283*a*, 283*b* are arranged parallel to the plane of movement of the shelf 241 to block the displacement of the tray 10 along a direction which is transverse to the plane of movement.

Substantially, the side boards 283*a*, 283*b* and the abutment elements 282 operate in conjunction with each other to anchor the tray 10 to the shelf 241, limiting any displacement caused by the movement of the shelf 241 inside the trolley 200. Additionally, the side boards 283*a*, 283*b* may serve as a guide for the entry and exit of the tray 10 into/from the shelf 241.

As shown in FIGS. 10, 11 and 12, the interfacing means 250 comprise a thrust assembly 284 configured to push the tray 10 along a thrust direction directed towards the exit opening 242 when the shelf 241 is in the exit area B in order to release the tray 10, allowing it to be picked up by an operator and/or a cabinet. Preferably, the thrust direction is substantially parallel to the plane of movement. In detail, the thrust assembly 284 comprises a stop element 285, which is adapted to abut against the tray 10, and elastic means 286 configured to move the stop element 285 between a home position, wherein it is moved away from the tray 10, and a thrust position wherein it is brought closer to the tray 10 to abut against it.

Suitably, the thrust assembly 284 comprises a holding body 287 of the abutment element 282 mounted on the trolley 200 at the point where the exit opening 242 is located so that the shelf 241, when in the exit area B, is placed between the stop element 285 and the exit opening 242. The stop element 285 is mounted on the holding body 287 in a sliding manner by means of a cylindrical pair which allows it to be moved along the thrust direction.

As shown in FIG. 12, the stop element 285 comprises a head portion 285*a*, adapted to abut against the tray 10, and an elongated body 285*b* mounted on the holding body 287 in a sliding manner. The elastic means 286 are provided with a spring 286*a* mechanically coupled to the stop element 285. Specifically, the spring 286*a* is loaded when the stop element 285 is in the home position and unloaded when the stop element 285 is in the thrust position.

Preferably, the spring 286*a* is positioned between at least the head portion 285*a* of the stop element 285 and the holding body 287.

Preferably, the spring 286*a* wraps around the elongated body 285*b* of the stop element 285.

Conveniently, the interfacing means 250 comprise an actuation mechanism configured to actuate the thrust assembly 284 when the shelf 241 is in the exit area B. Specifically, the actuation mechanism is configured to keep the spring 286*a* preloaded when the stop element 285 is in the home position and to release the spring 286*a* so that it can operate on the stop element 285 to move it to the thrust position.

In one or more embodiments, the interfacing means 250 may comprise a second thrust assembly 284 configured to push the tray 10 along a thrust direction directed towards the entry opening 249 when the shelf 241 is in the unloading area D in order to release the tray 10, allowing it to be picked up by a cabinet. The second thrust assembly 284 is entirely similar to the thrust assembly 284 described above and to the detailed description of which reference is made in full.

In one embodiment, the interfacing means 250 may comprise a conveyor belt 88, and/or a supporting surface, positioned at the point where the exit opening 242 and/or at the entry opening 249 is located and configured to move the tray 10 along the thrust direction in order to facilitate the exit thereof from the housing compartment 221, subsequent to the thrust given by the stop element 285. Advantageously, the processing means 238 of the trolley 200 are configured to control the operation of the trolley 200 in an at least partly automated manner. In particular, the processing means 238 are in signal connection with the movement assembly 240 and the interfacing means 250.

The processing means 238 may be connected to the hospital's central healthcare ICT architecture, such as e.g. via a software architecture owned by the Applicant which communicates with the central ICT architecture. In this way, information about medicines, their location and administration is always available and monitored by the processing means and/or by the central unit.

Advantageously, the trolley 200 of the present invention may operate under at least one of the following conditions also combinable with each other:

loading condition, wherein the trolley 200 receives one or more trays 10 from a cabinet 100 to store them in the housing compartment 221;

dispensing condition, wherein the trolley 200 selects and dispenses one or more trays 10 from the stored trays towards an operator;

unloading condition, wherein the trolley 200 interacts with a cabinet 100 to provide it with one or more trays 10.

In one or more embodiments, the trolley 200 may operate in multiple conditions simultaneously. For example, the loading condition and the unloading condition may occur simultaneously during a single interaction with the cabinet 100.

The loading condition mainly occurs when the trolley 200 is moved by an operator towards the cabinet 100, arranging the entry opening 249 close to the cabinet interaction door for the replenishment of medicines.

In the storage condition, the trolley 200 is configured to interface with the cabinet 100 to receive and store one or more medicines, preferably by means of the use of the trays 10 as described above.

At this point, the processing means 238 are configured to activate the movement assembly 240 to arrange the shelf 241 in the proximity of the input area A in order to receive the tray 10.

In particular, the cabinet, by means of suitable interfacing means, inserts the tray 10 into the entry opening 249 to arrange it in the free cell 262*a* from which it is subsequently picked up by the interfacing means 250 of the shelf 241.

In such a condition, the processing means 238 are configured to receive an identification signal identifying each tray 10 arranged on the shelf 241.

The term "identification signal" means a digital signal interpretable by the processing means 238 and containing information regarding the identifying element of the tray 10 and the medicines contained in such a tray 10. Such an identification signal allows for a univocal correspondence between a tray 10 and the medicine contained therein to make them easily traceable once they have been stored in the trolley 200 and/or transferred to the cabinet.

In one embodiment, the processing means 238 are configured to receive at input both the signal representative of the identification element of the tray 10 and the signal representative of one or more medicines in order to associate the signals with each other to generate a univocal identification signal which uniquely represents the tray 10 and the medicine contained therein.

The aforementioned signals may be continuously monitored by the processing means and/or by the hospital's central healthcare ICT architecture to smartly control all tracing operations of the medicines and of the trays 10 both inside the hospital environment and inside the trolley 200 and the cabinet 100.

Preferably, the processing means 238 are usable by an operator by means of a suitable interface connected thereto (e.g., the display 237, a smart-phone, a tablet, etc.) to generate one or more signals to be sent to the processing means 238. In particular, the operator may enter the data of the drug independently into the trolley 200 by means of the display 237 or directly with their smart-phone, tablet, and/or a PC.

In this way, the trolley 200 can operate as a drug dispenser (i.e., in so-called "dispensing" mode) to allow an operator to select, as needed, the drug to be picked up and dispensed. For example, the display 237 can illustrate the drugs contained in the trolley 200 and, by means of an electronic keypad or a touch screen, may allow the operators to select which of the illustrated drugs they want to take.

Upon receiving the univocal identification signal, the processing means activate the movement assembly 240 to move the tray 10 from the entry area A to the storage area C by arranging it inside an empty storage cell 262.

Preferably, the processing means 238, by means of specific software, control the movement assembly 240 to store the trays 10 in specific storage cells 262 also depending on the size of the drug housed therein. In this case, the processing means 238 are configured to arrange the low drugs in upper storage cells 262 and the high drugs in lower storage cells 262. This expedient allows the storage of the trays 10 to be optimized to have the tray/drug as close as possible to the worktop. At this point, the processing means 238 store the storage cell 262 wherein the tray 10 has been positioned. Preferably, such storage is accomplished by associating the univocal identification signal of the tray 10 with an identification parameter of the cell 262 itself, such as e.g. a coordinate reference, an identification number and/or the like.

In one or more embodiments, the trolley 200 may comprise proximity sensors configured to detect when the trolley 200 is in the proximity of the cabinet in order to activate the processing means 238.

The selection condition may mainly occur when the operator needs to take a drug from the trolley 200 to provide it to a patient.

In the selection condition, the trolley 200 is configured to select the storage cell 262 associated with the tray 10 containing the medicine to be provided to the patient, to pick up the tray 10 arranged in such a storage cell 262 and, finally, to place the picked up tray 10 at the point where a first pickup cell **262*b* is located so that an operator can pick up the tray 10**.

During pickup of the medicine from the first pickup cell **262*b*, the movement assembly 240 may be activated to move a second tray 10 containing another medicine to be picked up towards a second pickup cell 262*b*** in order to speed up the pickup operations of the medicines, as described above.

In such a condition, the processing means 238 are configured to receive one or more pieces of information regarding the medicine to be picked up based on which a selection signal is generated and sent to the movement assembly 240. The term "selection signal" means a digital signal interpretable by the processing means 238 and containing information regarding the medicine and/or the tray 10 to be selected and provided to the operator.

In actual facts, before administering the medicine to the patient, the operator reads the medical record and/or the relevant therapy sheet containing the patient's information and, on the basis of the latter, enters the medicine to be picked up via the display 237.

In one embodiment, the medical record can be of the digital type so that the trolley 200 can automatically recognize the patient to be treated and then autonomously provide the medicine to the operator or the list of medicines.

The processing means 238 are then instructed to activate the movement assembly 240 in order to arrange the shelf at the point where the storage cell 262 is located containing the tray 10 to be picked up and, subsequently, to activate the interfacing means 250 to pick up the tray 10 and move it towards the exit area B. Substantially, upon receiving the selection signal, the processing means identify the storage cell 262 on which the tray 10 to be picked up is arranged and activate the movement assembly 240 to pick up the tray 79 itself.

In one embodiment, prior to administering the medicine, it is possible to acquire information about the medicine being administered by prior reading the barcode, RFID and/or the like and also to acquire information about the badge of the operator in charge of administering by means of a reading device suitably provided in the trolley.

The unloading condition can mainly occur when the trolley 200 needs to be emptied, for example at the end of a workday or between shifts.

In the unloading condition, the trolley 200 is configured to interface with the cabinet 100 to provide it with the trays 10 contained in the housing compartment 221 in order to empty the trolley 200.

Specifically, the operator positions the trolley 200 at the point where the cabinet 100 is located by positioning the trolley 200 so that the entry opening 249 is coupled to the opening 114 of the cabinet 100.

In such a condition, the processing means 238 are configured to activate the movement assembly 240 to arrange the tray 10 in the unloading area D, placing it in the free cell **262*a* so that the cabinet can pick it up by means of its manipulator. In particular, the manipulator of the cabinet 100 operates by shifting towards the trolley 200 by extending beyond the front wall 105 of the cabinet 100 to cross at least partly both the opening 114 of the cabinet 100 and the entry opening 249 of the trolley 200. Once the manipulator has at least partly entered the trolley 200, it grasps the tray 10 to store it in the cabinet 100**.

This operation is finally repeated for each stored tray 10 of the trolley 200 to completely empty it, if necessary.

Preferably, the trolley 200 is powered by means of a rechargeable battery pack operatively connected to the various devices/elements of the trolley 200. During interfacing, the trolley 200 may connect to the cabinet 100 for charging the batteries. For this purpose, one or more connectors (e.g., bayonet, magnetic, etc.) may be provided at the bottom of the body 201 so that when the trolley 200 is joined to the cabinet 100, the battery charging operation begins.

It has in practice been ascertained that the described invention achieves the intended objects, and in particular the fact is emphasized that by means of the trolley according to the present invention it is possible:

- to store as many drugs/medicines as possible in the trolley so as to allow caregivers to treat a large number of patients on the same ward route;
- to store in the trolley a predefined number of drugs based on the patients to be treated, optimizing their dispensing according to the needs;
- to allow operators to pick up all the drugs to be administered from a position that is always elevated and comfortable regardless of the amount of drugs already administered and the remainder of those drugs in the trolley;
- to move the drugs inside the trolley in an indirect way, i.e. not handling the packages, blister packs, and/or medical devices, but operating only on certain trays in order to create a univocal association between the latter and a predefined drug to be administered;
- to manage the storage and dispensing of drugs of various sizes easily, simply and quickly;
- to visually inspect the drugs before picking them from the trolley;
- to facilitate the transport of the trolley by means of an assisted driving system which facilitates the changes of direction even in extremely small spaces;
- to allow the trolley to interface with one or more centralized hospital drug storage cabinets;

to allow the trolley, during the interfacing with the cabinet, to perform several activities at the same time, such as e.g. the optimized exchange of the trays containing drugs and the recharging of batteries of the trolley.

The invention claimed is:

1. A trolley for the dispensing of medicines, said trolley comprising:

a body surrounding a housing compartment for the storage of a plurality of medicines and provided with a worktop positioned above the housing compartment, an entry area of at least one medicine into said trolley and an exit area of said medicine from said trolley, and a movement assembly arranged at least partly inside said housing compartment and configured to move said medicine between at least said entry area and said exit area, wherein said exit area is in a position close to said worktop, the trolley comprising at least one tray configured to receive and contain at least one medicine, said movement assembly is provided with at least one shelf adapted to receive and support said tray to move said tray inside said housing compartment, the trolley comprising at least one storage area for the storage of said tray before being picked up by said movement assembly, said movement assembly comprises movement means connected to the shelf to move the shelf at least between the entry area, the storage area and the exit area, and said movement means comprise:

a guide, on which one or more of said shelves are engaged in a sliding manner, configured to guide the motion of said one or more shelves inside said housing compartment along a predefined movement trajectory; and a drive system which imparts the motion to each shelf along the guide.

2. The trolley according to claim 1, wherein said worktop comprises at least one exit opening arranged at the point where said exit area is located and adapted to allow the medicine to come out of said housing compartment.

3. The trolley according to claim 2, comprising an entry opening arranged at the point where said entry area is located and adapted to allow the medicine to exit/enter the housing compartment.

4. The trolley according to claim 3, wherein the body is defined as a whole by a front wall, a rear wall, a first and a second side wall, a base and said worktop, and wherein said entry opening is arranged at the point where one of said side walls is located and at a predefined height above the ground to allow the interfacing thereof with suitable cabinets for dispensing the medicines.

5. The trolley according to claim 1, wherein said movement means are configured to shift said shelf along at least a first vertical axis and along at least a second axis transverse to said first axis.

6. The trolley according to claim 5, wherein said movement means comprises at least a first and a second straight guide arranged, respectively, substantially parallel to said first and to said second axes and on which said shelf is mounted in a sliding manner.

7. The trolley according to claim 6, the trolley comprising interfacing means configured to operate in a receiving configuration, wherein the interfacing means are adapted to receive said tray to place said tray on said shelf, and a releasing configuration wherein the interfacing means are adapted to release said tray from said shelf.

8. The trolley according to claim 7, the trolley comprising a storage structure arranged internally to said housing compartment and provided with a plurality of supports, each of said supports being associable with at least one tray and being arranged at the point where one storage area is located.

9. The trolley according to claim 1, wherein the guide has a closed circular shape to move said shelf on a rotational plane.

10. The trolley according to claim 9, wherein said guide runs mainly vertically.

11. The trolley according to claim 10, wherein said drive system comprises at least:

a driving pulley, set in rotation by direct coupling to an actuator;

an idler pulley; and a drive member closed in a loop to wrap around the pulleys and on which said shelf is mounted.

* * * * *